US00RE37205E

(19) United States
(12) Reissued Patent
Yoneyama

(10) Patent Number: US RE37,205 E
(45) **Date of Reissued Patent: *Jun. 5, 2001**

(54) SILVER HALIDE COLOR PHOTOGRAPHIC MATERIAL

(75) Inventor: Hiroyuki Yoneyama, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/577,159

(22) Filed: Dec. 22, 1995

Related U.S. Patent Documents

Reissue of:
(64) Patent No.: 5,360,705
Issued: Nov. 1, 1994
Appl. No.: 07/964,960
Filed: Oct. 22, 1992

(30) Foreign Application Priority Data

Oct. 23, 1991 (JP) ..... 3-302660
Oct. 25, 1991 (JP) ..... 3-305571

(51) Int. Cl.[7] ..... G03C 1/46
(52) U.S. Cl. ..... 430/507; 430/512; 430/557; 430/546; 430/931; 430/551
(58) Field of Search ..... 430/557, 551, 430/546, 507, 512, 931

(56) References Cited

U.S. PATENT DOCUMENTS

| | | | | |
|---|---|---|---|---|
| 4,540,657 | * | 9/1985 | Krishnamurthy | 430/546 |
| 4,692,399 | * | 9/1987 | Sasaki et al. | 430/512 |
| 5,001,045 | * | 3/1991 | Furutachi et al. | 430/546 |
| 5,070,003 | * | 12/1991 | Naruse et al. | 430/557 |
| 5,316,903 | * | 5/1994 | Tomiyama | 430/546 |
| 5,378,594 | * | 1/1995 | Okazaki et al. | 430/545 |

FOREIGN PATENT DOCUMENTS

| | | | |
|---|---|---|---|
| 0304810 | * | 3/1989 | (EP) . |
| 0508398 | * | 10/1992 | (EP) . |
| 3264748 | * | 11/1988 | (JP) . |
| 1137258 | * | 5/1989 | (JP) . |

* cited by examiner

*Primary Examiner*—Geraldine Letscher
(74) *Attorney, Agent, or Firm*—Sughrue, Mion, Zinn, Macpeak & Seas, PLLC

(57) ABSTRACT

A silver halide color photographic material comprising a support having thereon a yellow color forming silver halide emulsion layer, a magenta color forming silver halide emulsion layer and a cyan color forming silver halide emulsion layer. The yellow color forming emulsion layer contains a silver halide emulsion having a silver chloride content of not less than 90 mol %, a yellow coupler and a bisphenol compound and optionally a difficultly water-soluble epoxy compound. One or more layers of the light-sensitive material may contain an ultraviolet light absorber.

18 Claims, No Drawings

SILVER HALIDE COLOR PHOTOGRAPHIC MATERIAL

Matter enclosed in heavy brackets [ ] appears in the original patent but forms no part of this reissue specification; matter printed in italics indicates the additions made by reissue.

FIELD OF THE INVENTION

This invention relates to a multi-layer silver halide color photographic material suitable for use in rapid processing. More particularly, it relates to a silver halide color photographic material which is excellent in fastness to light after processing, and still more particularly, to a silver halide color photographic material which is excellent in color developability.

BACKGROUND OF THE INVENTION

There are widely used methods for the color development of exposed light-sensitive materials with color developing agents, which involve the incorporation of photographic couplers, i.e., three color couplers of yellow, magenta and cyan couplers, into light-sensitive emulsion layers to form a color photographic dye.

It is required that the thus-formed developed dyes are bright yellow, magenta and cyan dyes having little secondary absorption and give photographic color images with good color reproducibility.

On the other hand, it is required that the formed photographic color images can be well-preserved under various conditions. Namely, it is required that the dye images are prevented to the extent possible from fading and discoloring and that stain is prevented to the extent possible from forming even when the color images are exposed to light over a long period of time and stored under high temperature and humidity conditions. Further, it is necessary that all three colors are prevented from fading to the same degree. However, there is a possibility that an improved method for preventing the fading of a certain dye image has an adverse effect—the color balance of the three colors is lost after fading and as a result, the quality of the photographic image deteriorates thereby.

There are many methods for improving the fastness of magenta dye images and cyan dye images at present, and the fastness of the images can be controlled. However, there is no method for improving the fastness of yellow dye images to light without having an adverse effect. Accordingly, it is a demand for a new method.

Some attempts have been made to improve the fastness of developed yellow dye images. To improve fastness to light, ultraviolet light absorbers to protect the dye image from ultraviolet rays and anti-fading agents which prevent the dye image from being faded by light, have been proposed.

For example, in the method for improving the light resistance of the dye image by adding ultraviolet light absorbers to color photographic materials, light resistance can be greatly improved in comparison with methods in which no ultraviolet light absorber is added. However, when the ultraviolet light absorbers are used in such an amount as to obtain a sufficient effect, there is the problem that white grounds are yellowed because the ultraviolet light absorbers themselves are colored. Further, when the ultraviolet light absorbers are used, they do not have the effect of preventing the dye image from being faded by visible light, and hence there is a limitation with regard to the degree of improvement in light resistance.

Among the anti-fading agents which prevent the dye image from being faded by light, there are many compounds which deteriorate the preservability of the dye image in a dark place, cause staining on white grounds or the discoloration of the dye image by light, heat and humidity or interfere with the color formation of the couplers. Hence, a sufficient color density can not be obtained. Accordingly, they have many practical problems. The bisphenols described in JP-B-48-31256 (the term "JP-B" as used herein means an "examined Japanese patent publication") and JP-B-48-31625 interfere with the color formation of the couplers, and hence they have practical problems. Particularly, when silver halide color photographic materials containing high silver chloride content emulsions having a silver chloride content of not less than 90 mol % are subjected to rapid processing with developing solutions containing no benzyl alcohol, there is the problem that these bisphenols are apt to lower the color density. Even when the amounts of the bisphenols to be added were increased, contrast was lightly lowered and an effect of improving sufficient fastness to light for practical use could not be obtained. Further, JP-A-64-50048 (the term "JP-A" as used herein means an "unexamined published Japanese patent application"), JP-A-64-50049 and JP-A-61-4041 disclose that cyclic ether compounds or compounds having an epoxy group are added to the photographic materials. However, an improving effect obtained hereby is still insufficient.

For the purposes of recording and storage, the light-sensitive materials must have the property that an image obtained immediately after processing not deteriorate even when the image is stored over a long period of time. At present, yellow dye images are poor in preservability in a dark place and the color thereof is likely to become turbid when stored over a long period of time. JP-A-64-50048, JP-A-64-50049 and JP-A-61-4041 l disclose the use of cyclic ether compounds or epoxy group-containing compounds to solve these problems. However, the improvement obtained thereby is still insufficient sufficient. Particularly, when rapid processing is carried out with developing solutions containing no benzyl alcohol, the effect obtained thereby is low. A solution to the problem of color turbidity of yellow dye images can be scarcely obtained, and there is a demand for a new method.

The present inventors have found that the fastness of yellow dye images to light can be greatly improved unexpectedly by using certain bisphenols in combination with ultraviolet light absorbers. Further, it has been found that color developability can be greatly improved by using certain epoxy compounds in combination therewith. The present invention has been accomplished on the basis of these findings.

SUMMARY OF THE INVENTION

One object of the present invention is to provide a silver halide color photographic material in which the fastness of the developed yellow color part to light after processing is improved to a sufficient level.

Another object of the present invention is to provide a silver halide color photographic material which is excellent in color developability and in which the fastness of developed yellow color part to light after processing is improved to a sufficient level.

The above-described objects of the present invention have been achieved by a silver halide color photographic material comprising a support having thereon a yellow color forming silver halide emulsion layer, a magenta color forming silver halide emulsion layer and a cyan color forming silver halide emulsion layer. The yellow color forming emulsion layer contains, (i) at least one high silver chloride emulsion having a silver chloride content of not less than 90 mol %, (ii) at least one yellow coupler represented by the following general formula (I) and (iii) at least one compound represented by the following general formula (II). The photographic material also comprises a layer which contains at least one ultraviolet light absorber.

(I)

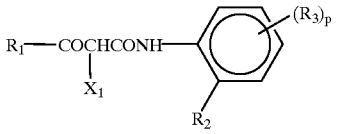

In general formula (I), $R_1$ represents a substituent group; $R_2$ represents a halogen atom, an alkyl group, an aryl group, an alkoxy group, an aryloxy group, a dialkylamino group, an alkylthio group or an arylthio group; $R_3$ represents a group which can be attached to the benzene ring; $X_1$ represents a hydrogen atom or a group which can be eliminated by a coupling reaction with the oxidation product of an aromatic primary amine developing agent; and p represents an integer of 0 to 4 and when p is 2 or greater, the two or more $R_3$ groups may be the same or different.

(II)

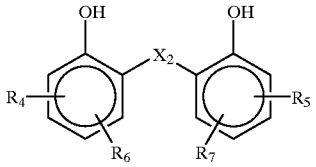

In general formula ( II ) , $R_4$, $R_5$, $R_6$ and $R_7$ each represents an alkyl group having 4 to 18 carbon atoms and the total number of carbon atoms in $R_4$, $R_5$, $R_6$ and $R_7$ is not more than 32; $X_2$ represents a simple bond, oxygen atom, sulfur atom, sulfonyl group or a bonding group represented by the following general formula (B):

(B)

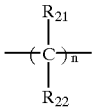

In general formula (B), R21 and R22 each represents a hydrogen atom or an alkyl group having 1 to 10 carbon atoms; and n represents an integer of 1 to 3 and when n is 2 or 3, the two or three R21 groups and the two or three R22 groups may be the same or different.

The yellow color forming emulsion layer in the photographic material described above may also contain at least one difficultly water-soluble epoxy compound having at least one group represented by the following general formula (AO):

(AO)

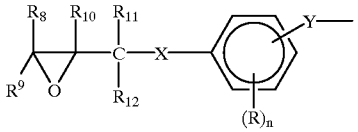

In general formula (AO), $R_8$, $R_9$, $R_{10}$, $R_{11}$ and $R_{12}$ may be the same or different and each represents a hydrogen atom, an alkyl group or an aryl group; R represents a substituent group; n represents an integer of 0 to 4; —Y— represents a bivalent bonding group; —X— represents —O—, —S— or —N(R')—; R' represents a hydrogen atom, an acyl group, an alkylsulfonyl group, an arylsulfonyl group, an aryl group, a heterocyclic group or —$C(R_{13})(R_{14})(R_{15})$; and $R_{13}$, $R_{14}$ and $R_{15}$ may be the same or different and each represents an alkyl group or a group represented by the following general formula ( AO-1 ) , and $R_{13}$ and $R_{14}$ each may also represent a hydrogen atom.

(AO-1)

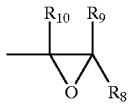

When n is 2 to 4, the two or more R groups may be the same or different; any two of $R_8$ to $R_{12}$, R' and R or two R groups my combine to form a five-membered to seven-membered ring, provided that when X is —S—, the total number of carbon atoms in the compound is not less than 15; when X is —O— and Y is —$SO_2$— or phenylene, either n is 1 to 4 or at least one of $R_8$ to $R_{12}$ is an alkyl group or an aryl group; and when X is —O— and Y is —O—$CO_2$—, the total number of carbon atoms in $R_8$ to $R_{12}$ and the R group or groups is not less than 10.

The above objects are also achieved by a silver halide color photographic material comprising a support having thereon a yellow color forming silver halide emulsion layer, a magenta color forming silver halide emulsion layer and a cyan color forming silver halide emulsion layer, wherein the yellow color forming silver halide emulsion layer contains (i) at least one high silver chloride emulsion having a silver chloride content of not less than 90 mol %, (ii) at least one yellow coupler represented by above defined general formula (I), (iii) at least one epoxy compound which has at least one group represented by above defined general formula (AO) and which is difficultly soluble in water, and (iv) at least one compound represented by the following general formula (IV):

(IV)

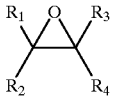

In general formula (IV), $R_1$, $R_2$, $R_3$ and $R_4$ independently represent a hydrogen atom, an aliphatic group, an aromatic group, an aliphatic oxycarbonyl group, an aromatic oxycarbonyl group or a carbamoyl group with the proviso that all of $R_1$, $R_2$, $R_3$ and $R_4$ are not simultaneously a hydrogen atom; the total number of carbon atoms is 8 to 60; and $R_1$ and $R_2$ or $R_3$ and $R_4$ may combine to form a five-membered to seven-membered ring.

DETAILED DESCRIPTION OF THE INVENTION

The present invention will be illustrated in more detail below.

The yellow couplers of general formula (I) which can be used in the present invention will be illustrated in more detail below.

In general formula (I), $R_1$ is preferably an aryl group, a tert-alkyl group or a group represented by the following general formula (D). The most preferred tertalkyl group is a t-butyl group.

(D)

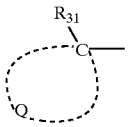

In general formula (D), R31 represents a mono-valent substituent group excluding a hydrogen atom; and Q represents a non-metallic atomic group required for forming a three-membered to five-membered hydrocarbon group together with C or a non-metallic atomic group required for forming a three-membered to five-membered heterocyclic ring together with C, said heterocyclic ring having at least one hetero-atom, as a member of the ring, selected from the group consisting of N, S, O and P. The ring formed by Q together with C may contain one or more unsaturated bonds in the ring. Examples of the ring formed by Q together with C include cyclopropane ring, cyclobutane ring, a cyclopentane ring, a cyclopropene ring, a cyclobutene ring and a cyclopentene ring. $R_{31}$ is preferably a halogen atom, a cyano group, a monovalent group having 1 to b 30carbon atoms (e.g., an alkyl group, an alkoxy group) or a monovalent group having 6 to 30 carbon atoms (e.g., an aryl group, an aryloxy group).

The term $R_2$ represents a halogen atom, an alkyl group, an aryl group, an alkoxy group, an aryloxy group, a dialkylamino group, an alkylthio group or an arylthio group. Preferably, $R_2$ is a chlorine atom, a methyl group, an ethyl group or a methoxy group. $R_3$ represents a substituent group which is attached to benzene ring. Particularly preferably, $R_3$ is a halogen atom, an alkoxy group, an aliphatic or aromatic or acyl substituted carbonamido group, sulfonamido group, sulfamoyl group or carboxylic acid ester group.

$X_1$ represents a hydrogen atom or a group which can be eliminated by a coupling reaction with the oxidation product of an aromatic primary amine developing agent. Particularly preferably, $X_1$ is an aryloxy group or a heterocyclic group which is attached to a coupling active site through nitrogen atom. Details regarding the group which can be eliminated by a coupling reaction with the oxidation product of an aromatic primary amine developing agent are disclosed in U.S. Pat. No. 4,622,287, at column 7, line 20 to column 8, line 34, and examples of such the group are recited at columns 37 to 54. The recited examples of the group can be used in the present invention as $X_1$. p represents an integer of 0 to 4, and when p is 2 or greater, the two or more $R_3$ groups may be the same or different.

The couplers of general formula (I) may be in the form of a dimer or a polymer by combining two or more of them through a bivalent or polyvalent group.

The yellow couplers of general formula (I) are used in an amount of 0.1 to 1.0 mol, preferably 0.1 to 0.5 mol, per mol of silver halide.

Specific examples of $X_1$, $R_3$ and the yellow couplers of general formula (I) include, but are not limited to, the following groups and compounds:

Examples of $X_1$:

(1)

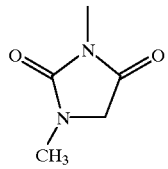

(2)

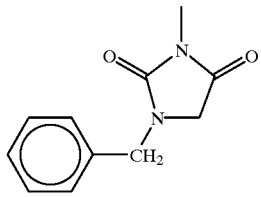

(3)

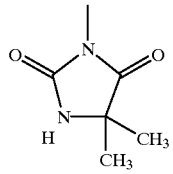

(4)

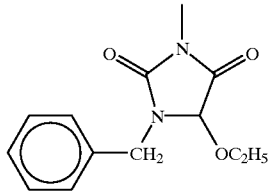

(5)

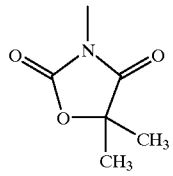

(6)

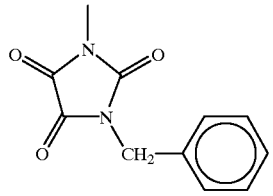

(7)

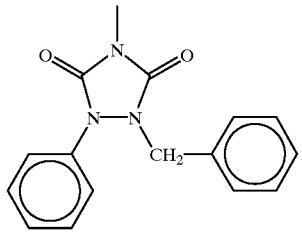

(8)

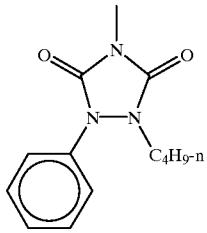

-continued
(9)
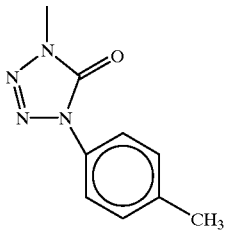
(10)
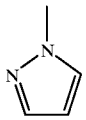
(11)
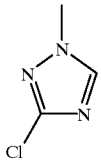
(12)
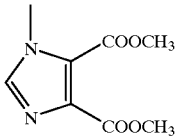
(13)
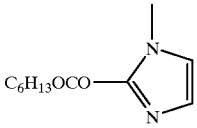
(14)
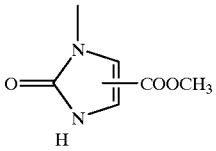
(15)
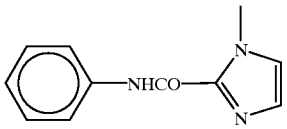
(16)
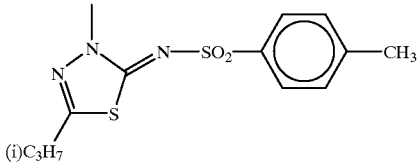
(17)
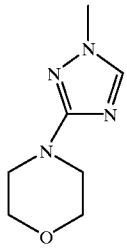
-continued
(18)
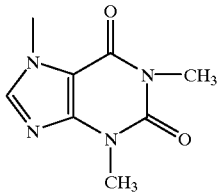
(19)
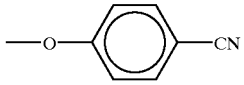
(20)
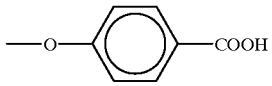
(21)
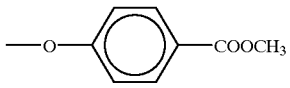
(22)
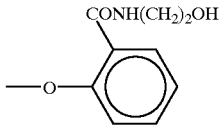
(23)
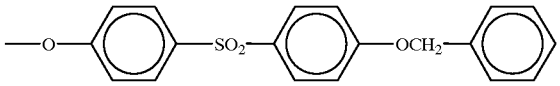
(24)
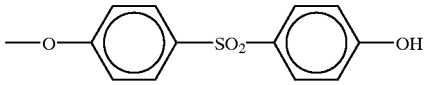
(25)
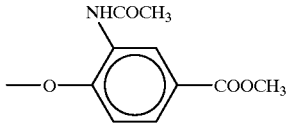
(26)
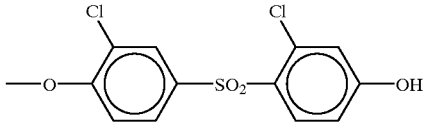
(30)
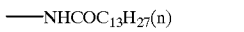
(31)
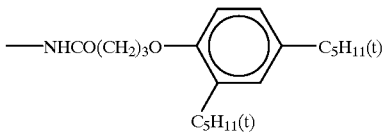

-continued
(32)
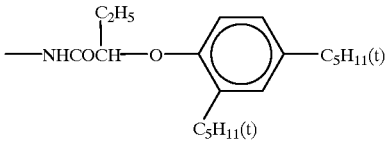
(33)
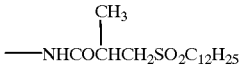
(34)
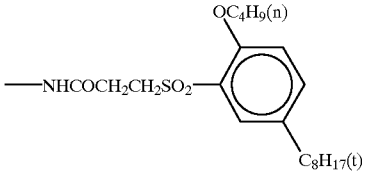
(35)
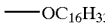
(36)
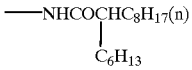
(37)
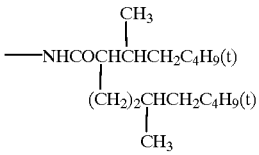
(38)
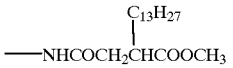
-continued
(39)
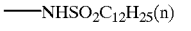
(40)
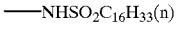
(41)
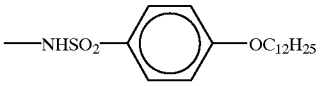
(42)
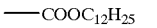
(43)
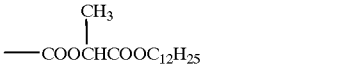
(44)
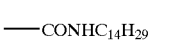
(45)
(46)
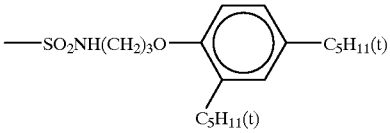
(47)
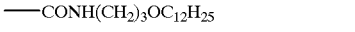
(48)
TABLE 1
Examples of the compounds of general formula (I)
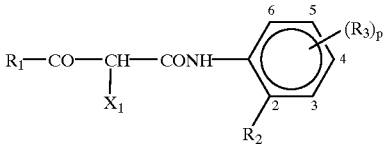
| No. | $R_1$ | $R_2$ | $R_3)p$ | $X_1$ |
|---|---|---|---|---|
| Y-1 | (t)$C_4H_9$— | —$OCH_3$ | (32)* [5]** | (4)* |
| Y-2 | (t)$C_4H_9$— | —$OCH_3$ | (32) [5] | (5) |
| Y-3 | (t)$C_4H_9$— | —$CH_3$ | (31) [5] | (2) |
| Y-4 | (t)$C_4H_9$— | 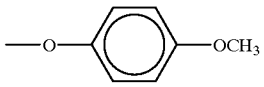 | (32) [5] | (5) |
| Y-5 | (t)$C_4H_9$— | 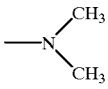 | (32) [5] | (4) |
| Y-6 | (t)$C_4H_9$— | —$OCH_3$ | (33) [5] | (8) |
| Y-7 | (t)$C_4H_9$— | —$OC_2H_5$ | (33) [5] | (7) |
| Y-8 | (t)$C_4H_9$— | —$OCH_3$ | (31) [5] | (23) |

TABLE 1-continued
Examples of the compounds of general formula (I)
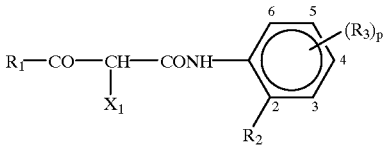
| No. | $R_1$ | $R_2$ | $R_3)p$ | $X_1$ |
|---|---|---|---|---|
| Y-9 | $(t)C_4H_9$— | 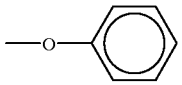 | (40) [5] | (19) |
| Y-10 | $(t)C_4H_9$— | —$OC_8H_{17}$(n) | (45) [4] | (5) |
| Y-11 | $(t)C_4H_9$— | —$OC_8H_{17}$(n) | (45) [5] | (5) |
| Y-12 | $(t)C_4H_9$— | —$OCH_3$ | (42) [5] | (4) |
| Y-13 | $(t)C_4H_9$— | 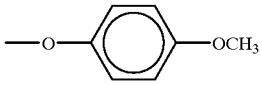 | (30) [5] | (10) |
| Y-14 | $(t)C_4H_9$— | —$OC_{16}H_{33}$(n) | — | (15) |
| Y-15 | $(t)C_4H_9$— | —$OCH_2CH_2OCH_3$ | (34) [5] | (8) |
| Y-16 | $(t)C_4H_9$— | —$CH_3$ | (43) [5] | (9) |
| Y-17 | $(t)C_4H_9$— | —$C_2H_5$ | (47) [5] | (8) |
| Y-18 | $(t)C_4H_9$— | —$OCH_3$ | (46) [5] | (2) |
| Y-19 | $(t)C_4H_9$— | —$OC_8H_{17}$(n) | (45) [4] | (5) |
| Y-20 | $(t)C_4H_9$— | —$OCH_3$ | (31) [5]<br>(45) [5] | (19) |
| Y-21 | $(t)C_4H_9$— | 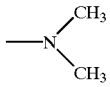 | (36) [4] | (18) |
| Y-22 | $(t)C_4H_9$— | 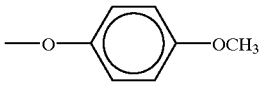 | (41) [5] | (11) |
| Y-23 | $(t)C_4H_9$— | 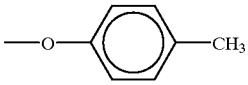 | (37) [5] | (3) |
| Y-24 | $(t)C_4H_9$— | —$OC_2H_5$ | (37) [5] | (1) |
| Y-25 | $(t)C_4H_9$— | —$CH_3$ | (38) [5] | (2) |
| Y-26 | $(t)C_4H_9$— | —$C_2H_5$ | (38) [5] | (2) |
| Y-27 | $(t)C_4H_9$— | —$CH_3$ | (33) [5] | (2) |
| Y-28 | 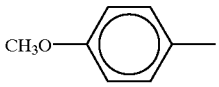 | —$OCH_3$ | (42) [5] | (4) |
| Y-29 | 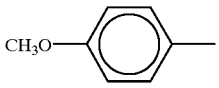 | 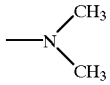 | (40) [5] | (4) |
| Y-30 | 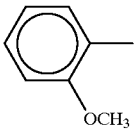 | —$CH_3$ | (43) [5] | (2) |
| Y-31 | $(t)C_4H_9$— | Cl | (32) [5] | (4) |

TABLE 1-continued

Examples of the compounds of general formula (I)

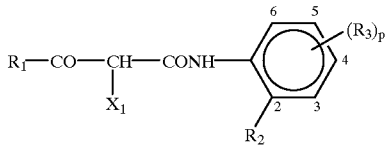

| No. | $R_1$ | $R_2$ | $R_3)p$ | $X_1$ |
|---|---|---|---|---|
| Y-32 | (t)$C_4H_9$— | Cl | (42) [5] | (4) |
| Y-33 | (t)$C_4H_9$— | Cl | (31) [5] | (26) |
| Y-34 | (t)$C_4H_9$— | Cl | (32) [5] | (5) |
| Y-35 | (t)$C_4H_9$— | Cl | (31) [5] | (11) |
| Y-36 | (t)$C_4H_9$— | Cl | (31) [5] | (23) |
| Y-37 | (t)$C_4H_9$— | Cl | (33) [5] | (2) |
| Y-38 | (t)$C_4H_9$— | Cl | (33) [5] | (7) |
| Y-39 | 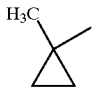 | Cl | (32) [5] | (4) |
| Y-40 | 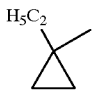 | Cl | (32) [5] | (4) |
| Y-41 | 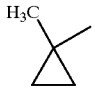 | —$OCH_3$ | (37) [5] | (3) |
| Y-42 | 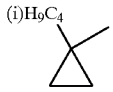 | Cl | (32) [5] | (4) |
| Y-43 | 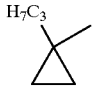 | Cl | (31) [5] | (4) |
| Y-44 | 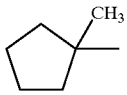 | Cl | (32) [5] | (4) |
| Y-45 | 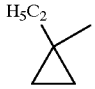 | Cl | (42) [5] | (4) |

*represents the number of the above-described group.
**The bracketed part represents the position of the group.

The compounds of general formula (II) are illustrated in more detail below.

In general formula (II), $X_2$ is preferably an alkylene group which may be any of a straight-chain group, a branched-chain group and a cyclic group. $R_4$ to $R_7$ each represents an alkyl group. The total number of carbon atoms in $R_4$ to $R_7$ is not more than 32. The term "an alkyl group" encompasses a substituted alkyl group and an unsubstituted alkyl group. The alkyl group may be a straight-chain group, a branched-chain group or a cyclic group. The alkyl groups adjacent to the phenolic hydroxyl groups are preferably secondary or primary alkyl groups.

The compounds of general formula (II) are used in an amount of generally 1 to 100 mol %, preferably 1 to 30 mol %, based on the amount of the coupler of the present invention.

The compounds of general formula (II) can be synthesized in accordance with the method described in U.S. Pat. No. 3,265,506.

Specific examples of the compounds of general formula (II) include, but are not limited to, the following compounds:

(II-1)
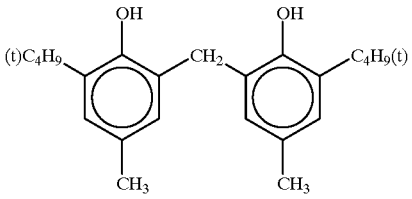
(II-2)
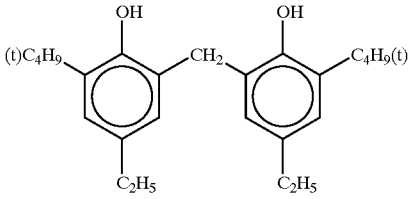
(II-3)
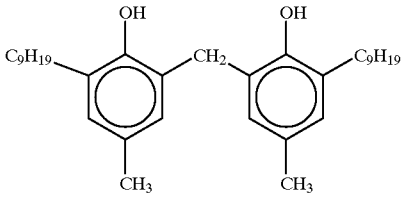
(II-4)
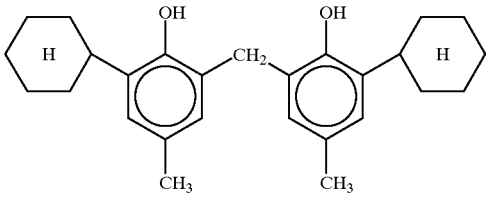
(II-5)
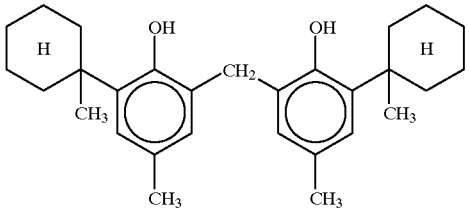
(II-6)
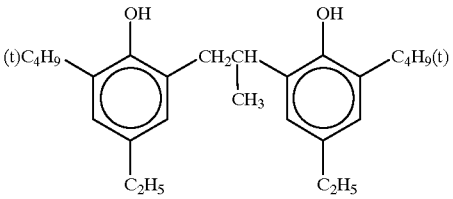
(II-7)
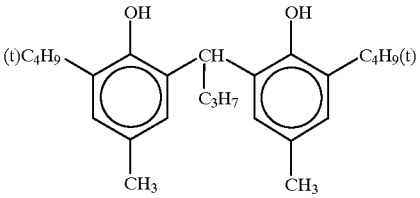
-continued
(II-8)
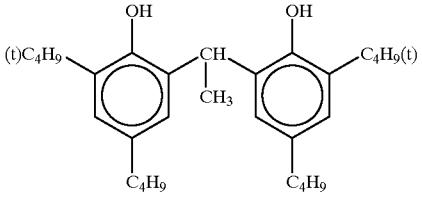
(II-9)
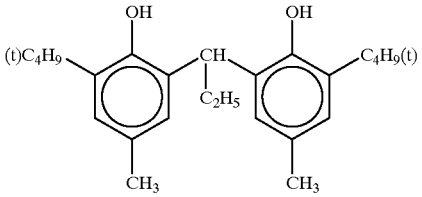
(II-10)
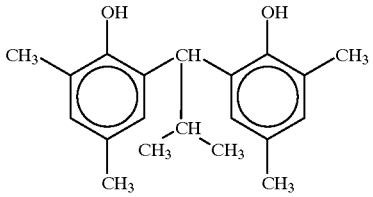
(II-11)
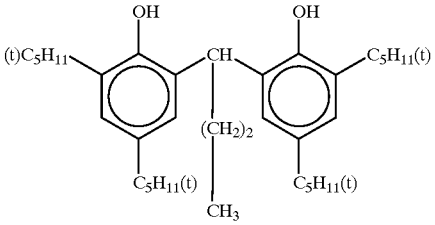
(II-12)
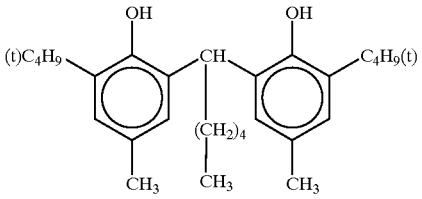
(II-13)
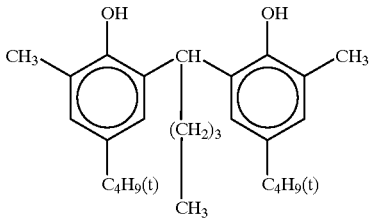
(II-14)
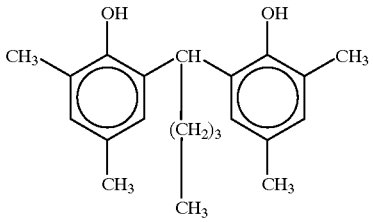

-continued (II-15)

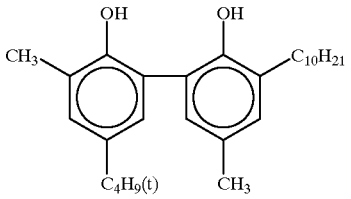

(II-16)

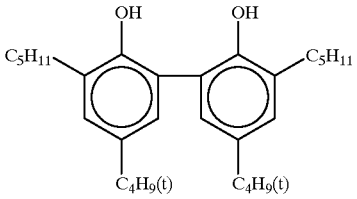

(II-17)

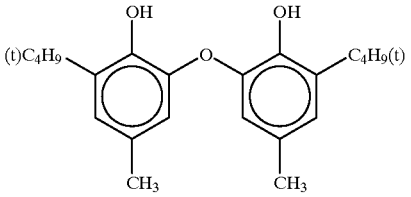

(II-18)

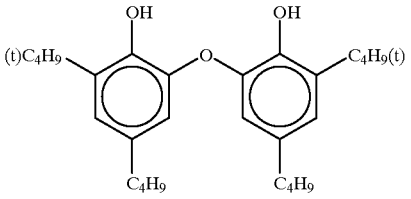

(II-19)

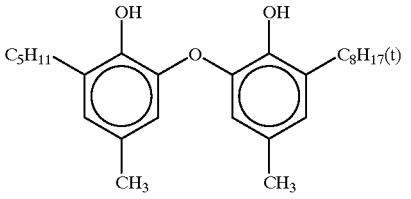

(II-20)

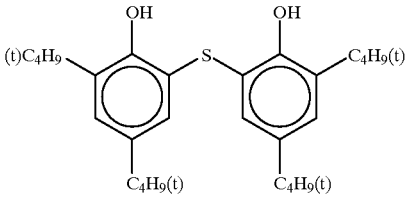

(II-21)

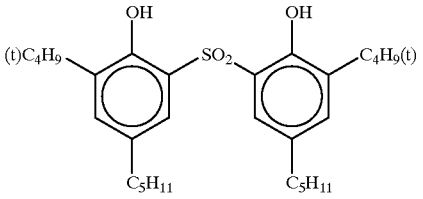

-continued (II-22)

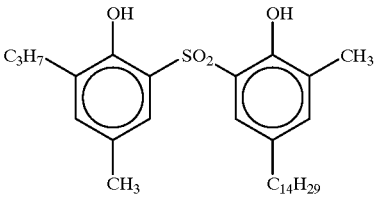

(II-23)

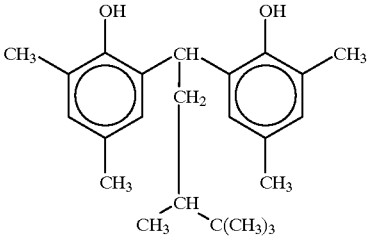

The epoxy compounds having a group represented by general formula (AO) which are difficultly soluble in water according to the present invention are illustrated in more detail below.

The epoxy compounds which are difficultly soluble in water refer to epoxy compounds having solubility of not more than 10% in water and having not less than 9 carbon atoms, preferably not less than 18 carbon atoms, more preferably not less than 30 carbon atoms, in total.

The "alkyl group" in general formula (AO) is a straight-chain, branched or cyclic alkyl group (e.g., methyl, ethyl n-propyl, i-propyl, n-butyl, t-butyl, cyclohexyl, n-octyl, t-octyl, n-decyl, sec-dodecyl, n-hexadecyl, n-octadecyl) which may be substituted.

The "aryl group" in general formula (AO) is aromatic hydrocarbon group (e.g., phenyl, naphthyl) which may be substituted.

The "heterocyclic group" in general formula (AO) is a five-membered to seven-membered cyclic group having at least one hetero-atom, as a member of the ring, selected from the group consisting of an oxygen atom, a nitrogen atom and a sulfur atom. The cyclic group may be an aromatic ring and may be substituted. Examples of the heterocyclic group include thienyl furyl, imid azolyl, pyrazolyl, pyrrolyl, indolyl, pyridyl, chromanyl, pyrazolidinyl, piperazinyl, 4-morpholinyl and triazinyl.

Examples of the "substituent group" in general formula (AO) include an alkyl group, an alkenyl group, an alkinyl group, an aryl group, a heterocyclic group, an alkoxy group, an aryloxy group, an alkylthio group, an arylthio group, a hydroxyl group, a halogen atom, a cyano group, a nitro group, an acyl group, an acyloxy group, a silyloxy group, a sulfonyl group, a sulfonyloxy group, an alkoxycarbonyl group, an aryloxycarbonyl group, an amido group, an imido group, a carbamoyl group, a sulfamoyl group, a ureido group, a urethane group, an aminosulfamoyl group, an amino group, an alkylamino group, an arylamino group and a heterocyclic amino group.

$R_8$, $R_9$, $R_{10}$, $R_{11}$, and $R_{12}$, may be the same or different and each represents a hydrogen atom, an alkyl group or an aryl group; R represents a substituent group; n represents an integer of 0 to 4, and when n is 2 to 4, the two or more R groups may be the same or different; —Y— represents a bivalent bonding group (e.g., a simple bond, —O—, —S—, —$SO_2$—, an imino group which may be substituted with —S—, —O—$CO_2$—, an alkylene group which may be substituted, a phenylene group which may be substituted, a naphthylene group which may be substituted, a bivalent heterocyclic group); X represents —O—, —S— or —N(R')—; R' represents a hydrogen atom, an acyl group (e.g., acetyl, acryloyl, benzoyl), an alkylsulfonyl group (e.g., methanesulfonyl, ethanesulfonyl, dodecanesulfonyl), an arylsulfonyl group (e.g., benzenesulfonyl, toluenesulfonyl), an aryl group, a heterocyclic group or —$C(R_{13})(R_{14})(R_{15})$; and $R_{13}$, $R_{14}$ and $R_{15}$ may be the same or different and each represents the above-described alkyl group or a group represented by general formula (AO-1), and $R_{13}$ and $R_{14}$ each represents further hydrogen atom.

$R_8$, $R_9$ and $R_{10}$ in general formula (AO-1) have the same meaning as in general formula (AO).

Any two of $R_8$ to $R_{12}$, R' and the one R or two R groups may combine to form a five-membered to seven-membered ring, provided that when X is —S—, the total number of carbon atoms in the compound is not less than 15; when X is —O— and —Y— is —$SO_2$— or a phenylene group, either n is an integer of 1 to 4 or at least one of $R_8$ to $R_{12}$ is an alkyl group or an aryl group; or when X is —O— and Y is —O—$CO_2$—, the total number of carbon atoms in $R_8$ to $R_{12}$ and the R group or groups is not less than 10.

The atom to which the group represented by general formula (AO) is attached (i.e., through the "—Y—" group) may be a hydrogen atom, a carbon atom, a nitrogen atom, a sulfur atom or an oxygen atom.

Among the epoxy compounds having groups of general formula (AO), those compounds having at least three groups, more preferably at least four groups, still more preferably at least five groups, of general formula (AO) are preferred from the viewpoint of the benefits of the present invention. With regard to the number of benzene rings in the epoxy compounds having groups of general formula (AO), the total number of benzene rings is preferably at least two, more preferably at least three, still more preferably at least four.

Among the epoxy compounds having groups of general formula (AO), compounds represented by the following general formulas (AE-1), (AE-2), (AE-3) and (AE-4) are preferred:

(AE-1)

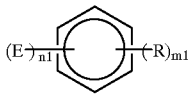

(AE-2)

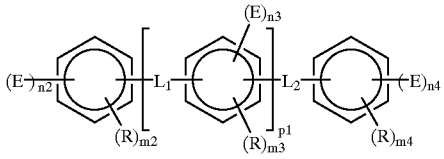

(AE-3)

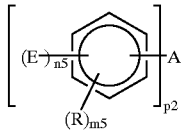

-continued (AE-4)

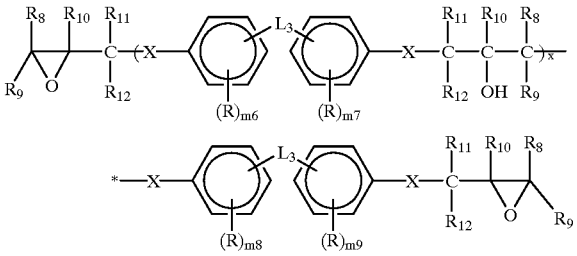

In general formulas (AE-1) to (AE-3), E represents a group represented by the following general formula (AO-2):

(AO-2)

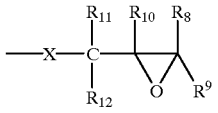

$R_8$ to $R_{12}$ and X in general formula (AO-2) have the same meaning as in general formula (AO).

In general formulas (AE-1) to (AE-4), R is as defined above in general formula (AO); and $L_1$, $L_2$ and $L_3$ may be the same or different and each represents a bivalent bonding group. $L_1$, $L_2$ and $L_3$ are preferably each an alkylene group which may be substituted. Examples of $L_1$, $L_2$ and $L_3$ include the following groups:

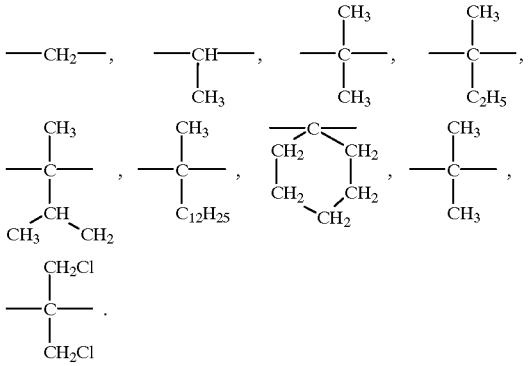

In general formulas (AE-1) to (AE--4), $n_1$ represents an integer of 3 to 6; $m_1$ represents an integer of to 3; $n_2$ represents an integer of 1 to 5; $n_3$ represents an integer of 1 to 4; $n_4$ represents an integer of 1 to 5; $m_2$ represents an integer of 0 to 4; $m_3$ represents an integer of 0 to 3; $m_4$ represents an integer of 0 to 4; $n_5$ represents an integer of 1 to 5; $m_5$ represents an integer of 0 to 4; $m_6$ to $m_9$ each represents an integer of 0 to 4; $p_1$ and x each represents a real number of 0 to 20; $p_2$ represents an integer of 3 to 4; and A represents a trivalent or tetravalent organic group. Examples of A include the following groups:

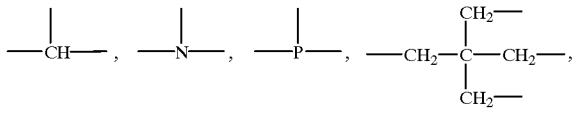

-continued

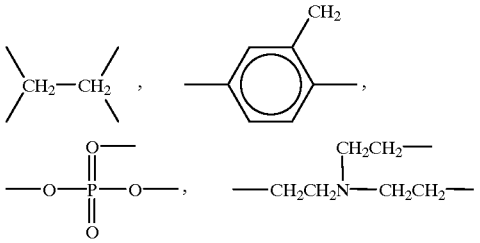

When two or more E or R groups are present, the two or more E groups may be the same or different, and the two or more R groups may be the same or different.

The compounds of general formula (AE-2) or (AE-3) may be in the form of a mixture composed of compounds wherein the number represented by $p_1$ or $p_2$ is different.

Among the compounds of general formulas (AE-1) to (AE-4), the compounds of general formulas (AE-1) to (AE-3) are preferred. More preferred are the compounds of general formulas (AE-2) to (AE-3). Most preferred are the compounds of general formula (AE-2).

Among the compounds of general formula (AE-2), compounds wherein —X— in general formula (AO-2) is —O— are preferred. In general formula (AE-2), $p_1$ is a number of preferably 1 to 20, more preferably 2 to 20, still more preferably 3 to 20, most preferably 4 to 20, $n_2$ to $n_4$ are each preferably a number of 1 to 2, $m_2$ to $m_4$ are each preferably a number of 0 to 3, most preferably 1 to 2, and R is preferably an alkyl group, a halogen atom or an alkoxy group.

Specific examples of the compounds of the present invention include, but are not limited to, the following compounds:

(A-1)

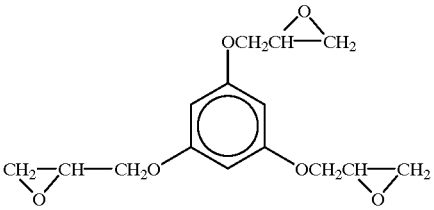

(A-2)

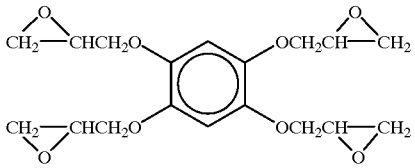

(A-3)

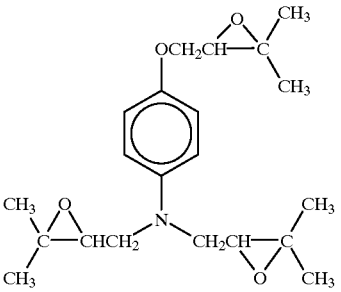

(A-4)

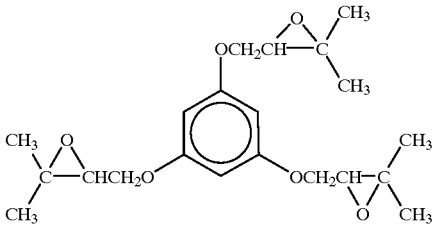

(A-5)

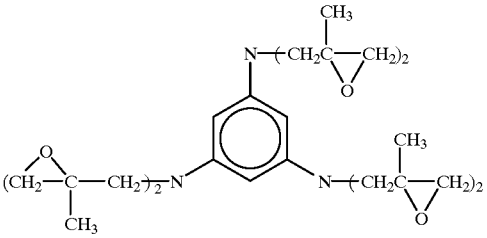

(A-6)

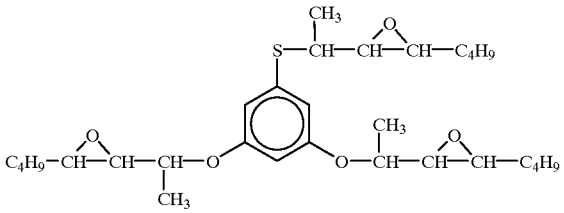

(A-7)

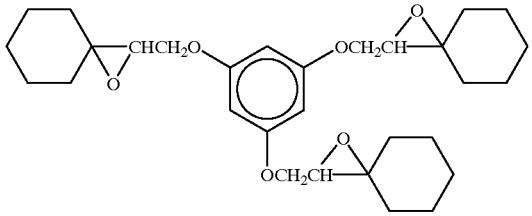

(A-8)

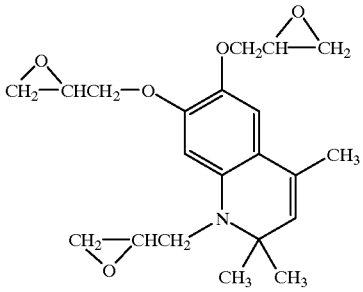

-continued
(A-9)
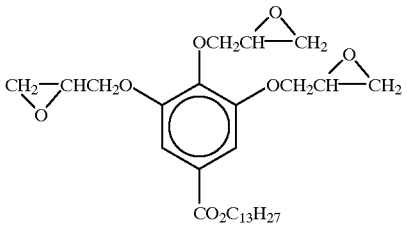
(A-10)
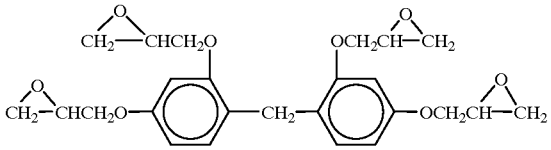
(A-11)
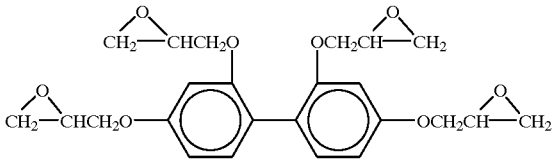
(A-12)
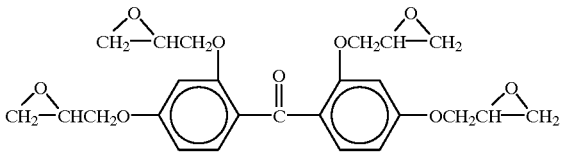
(A-13)
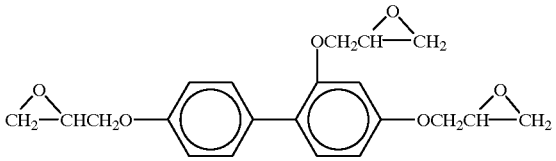
(A-14)
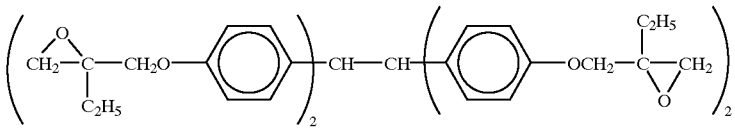
(A-15)
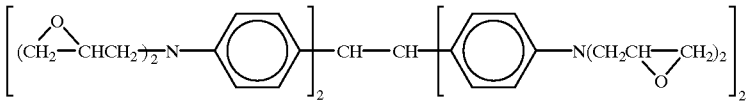
(A-16)
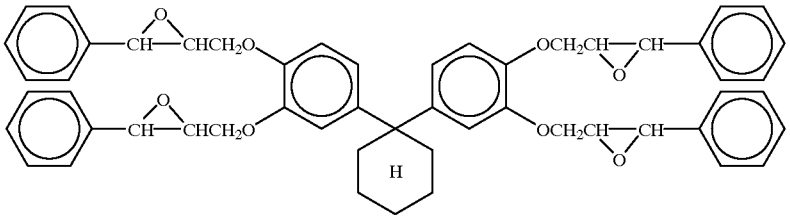
(A-17)
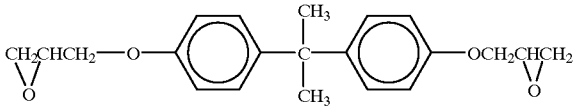
(A-18)
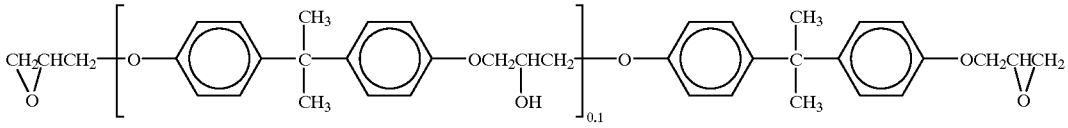

-continued
(A-19)
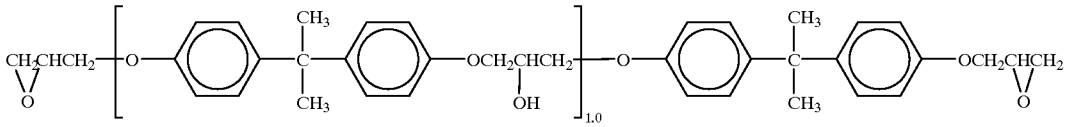
(A-20)
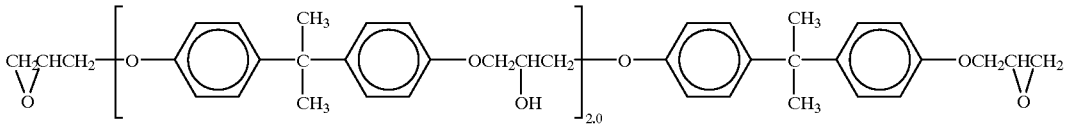
(A-21)
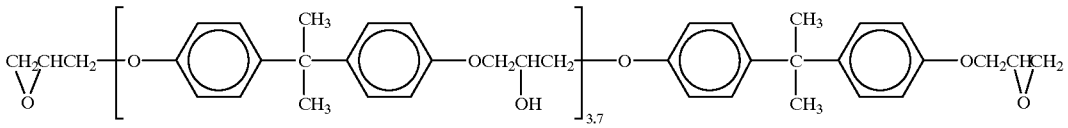
(A-22)
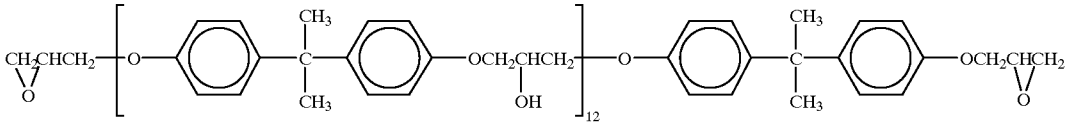
(A-23)
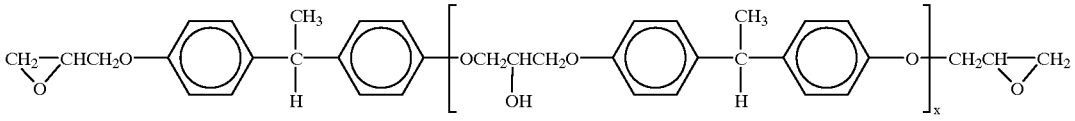
(A-24)
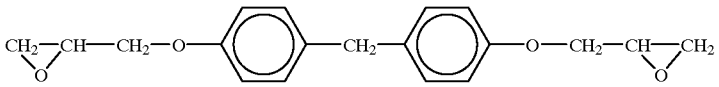
(A-25)
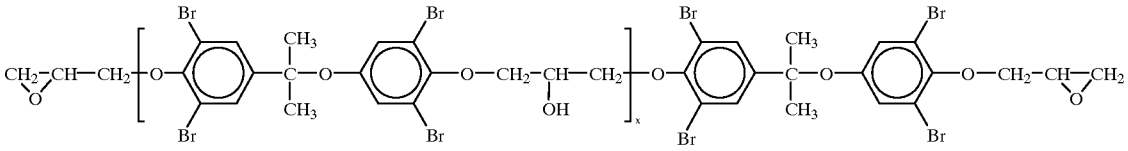
(A-26)
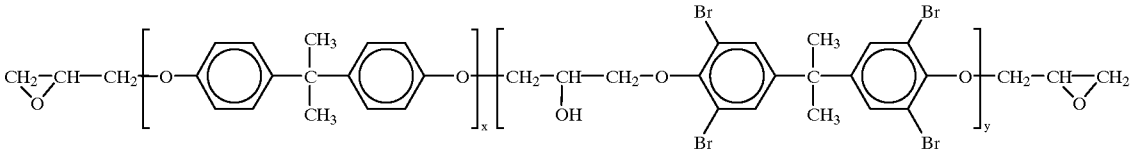
(A-27)
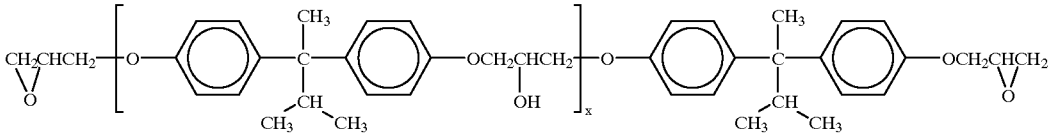

-continued
(A-28)
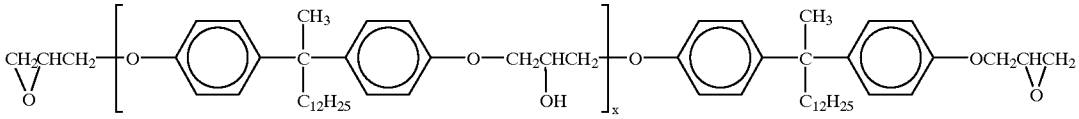
(A-29)
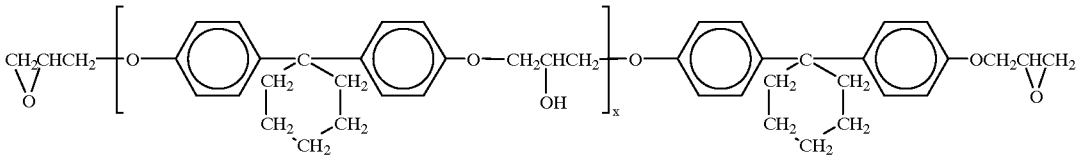
(A-30)
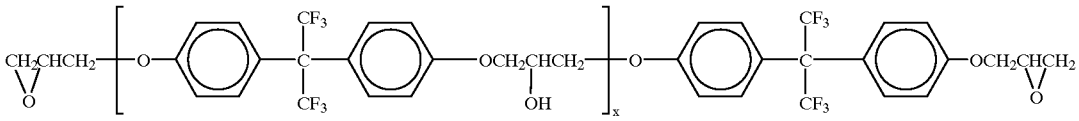
(A-31)
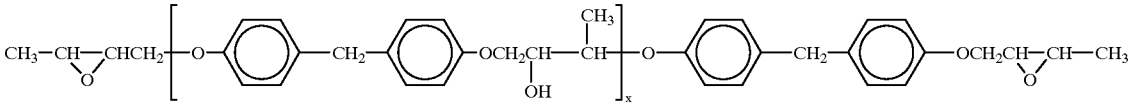
(A-32)
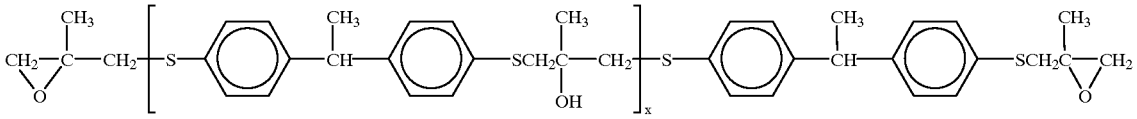
(A-33)
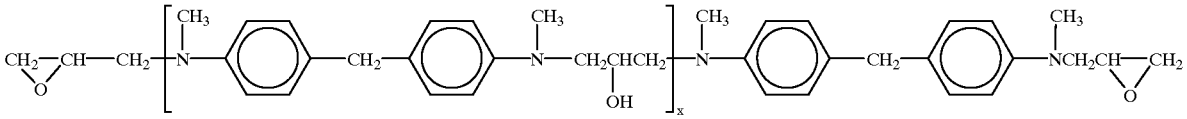
(A-34)
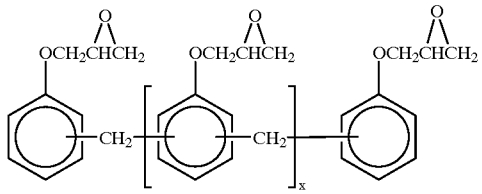
(A-35)
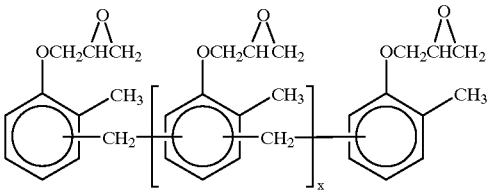
(A-36)
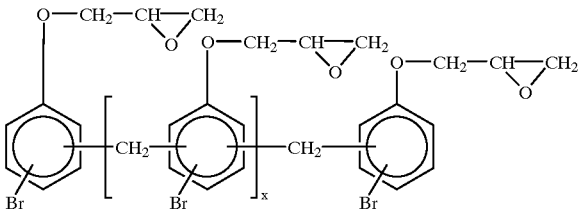
(A-37)
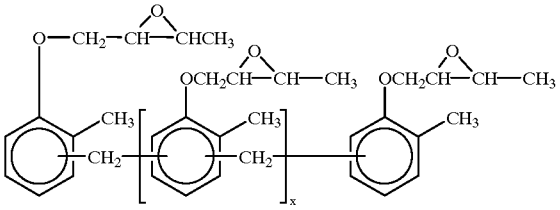

-continued
(A-38)
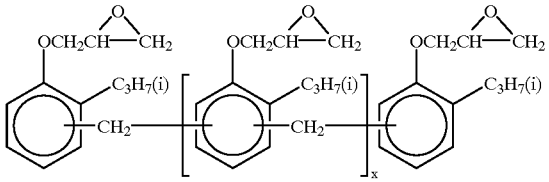
(A-39)
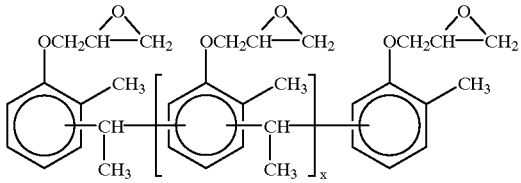
(A-40)
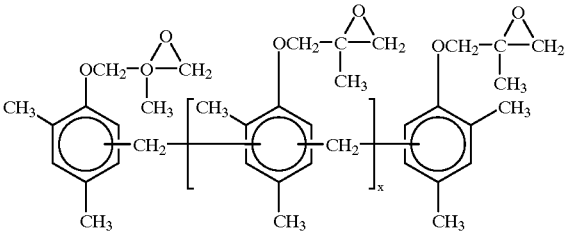
(A-41)
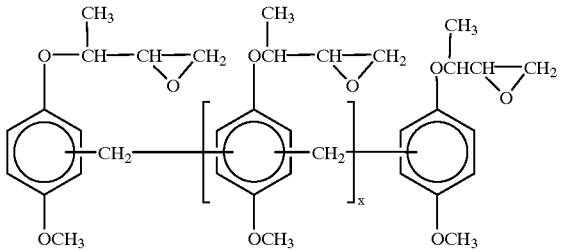
(A-42)
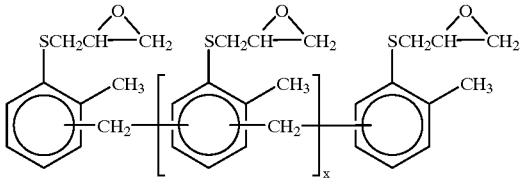
(A-43)
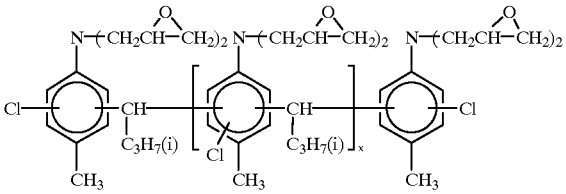
(A-44)
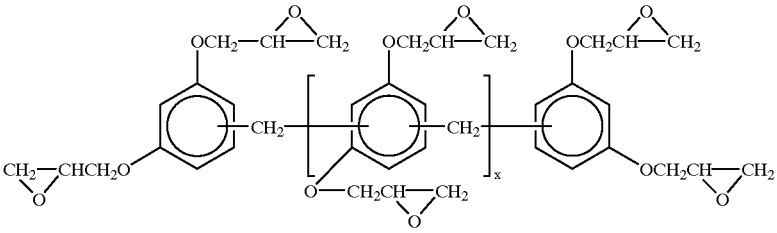
(A-45)
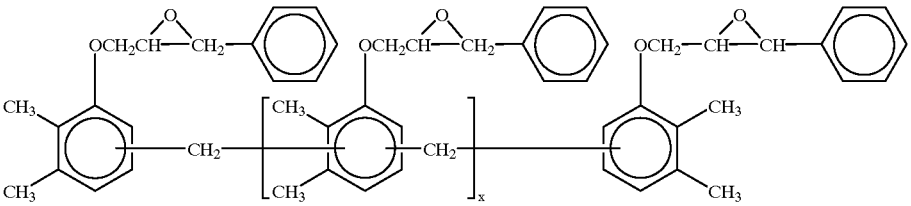
(A-46)
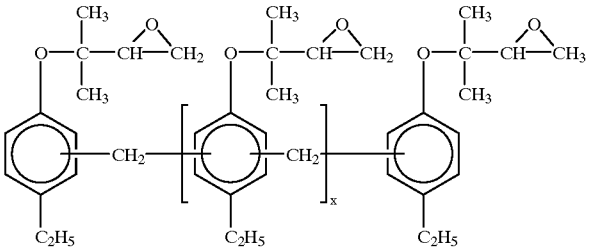
(A-47)
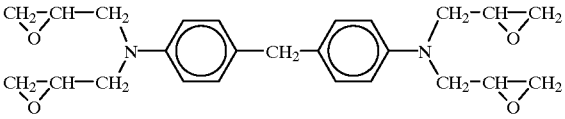

-continued (A-48)

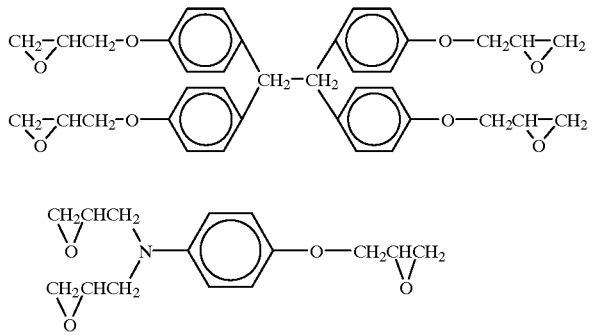

(A-49)

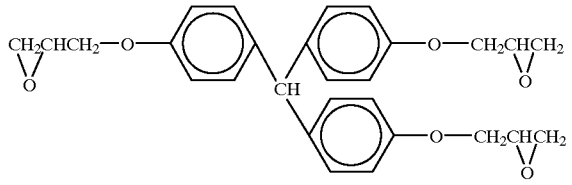

(A-50)

Variables x and y in the structural formulas each represent a real number and each may be any number, so long as each is in the range of 0 to 20, and x may not always be an integer. This is because a mixture of epoxy compounds having different integers are present in a specific mixing ratio, and x represents the mean number thereof. These epoxy compounds may be used either alone or in combination of two or more.

The epoxy compounds alone according to the present invention or together with couplers may be emulsified and dispersed in a hydrophilic binder such as an aqueous gelatin solution by using a surfactant.

The epoxy compounds themselves according to the present invention may be used as high-boiling organic solvents, but the epoxy compounds of the present invention may be used together with other high-boiling organic solvents which have a boiling point of not lower than 160° C. and are difficultly soluble in water, or with low-boiling organic co-solvents and/or polymers which are insoluble in water, but soluble in organic solvents. Preferred examples of the high-boiling organic solvents and the polymers are described in JP-A-64-537. The couplers and the difficultly water-soluble epoxy compounds may be added to separate layers, but it is preferred that they are added to the same layer, particularly in the same oil droplets.

The epoxy compounds of the present invention can be obtained, for example, by reacting bisphenol A with epichlorohydrin in the presence of sodium hydroxide (see, Plastic Material Lecture, (5) Epoxy Resin, by Naoshiro Oishi, published by Nikkan Kogyo Shinbunsha (Japan)). The epoxy compounds of the present invention are used in an amount of preferably 3 to 100% by weight, more preferably 5 to 30% by weight, based on the amount of the yellow coupler.

Any compound having an absorption peak in the range of 330 to 400 nm and no absorption peak in the range of 420 to 750 nm can be used as the ultraviolet light absorber of the present invention. However, compounds represented by the following general formula [Va] or [Vb] are preferred:

[Va]

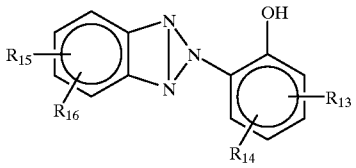

-continued

[Vb]

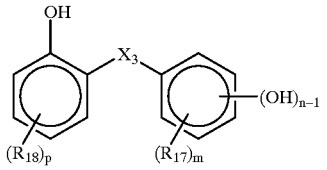

In general formula [Va], $R_{13}$ to $R_{16}$ each represents a hydrogen atom, a halogen atom, a nitro group, a hydroxyl group, an alkyl group, an alkoxy group, an aryl group, an aryloxy group, an acylamino group, a carbamoyl group, a sulfo group, an alkylthio group or an arylthio group; or $R_{13}$ and $R_{14}$, and/or $R_{15}$ and $R_{16}$ may combine to form a ring.

In general formula [Vb], $R_{17}$ and $R_{18}$ each represents a hydrogen atom, an alkyl group or an acyl group; $X_3$ represents —CO— or —COO—; and m represents an integer of 3 to 5, n represents an integer of 1 to 4 and p represents an integer of 1 to 4.

Each group in general formula [Va] or [Vb] may be further substituted.

The number of carbon atoms in each group in general formula [Va] or [Vb] is preferably in the range of 1 to 20.

2-(2'-Hydroxyphenyl)benztriazole ultraviolet light absorbers of general formula [Va] which can be used in the present invention may be any of the compounds which are solid or liquid at room temperature. Examples of liquid compounds are described in JP-B-55-36984, JP-B-55-12587 and JP-A-58-214152.

The details regarding the atoms or groups represented by $R_{13}$ to $R_{16}$ in the ultraviolet light absorbers of general formula [Va] are described in JP-A-58-221844, JP-A-59-46646, JP-A-59-109055, JP-B-36-10466, JP-B-42-26187, JP-B-48-5496, JP-B-48-41572, U.S. Pat Nos. 3,754,919 and 4,220,711.

The details regarding the groups represented by $R_{17}$ and $R_{18}$ in the benzophenone ultraviolet light absorbers of general formula [Vb] are described in JP-B-48-30493 (U.S. Pat. No. 3,698,907) and JP-B-48-31255.

Specific examples of the ultraviolet light absorbers which can be used in the present invention include, but are not limited to, the following compounds:

TABLE 2

Compounds of general formula [Va]

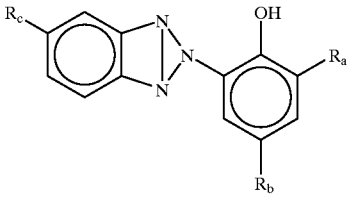

| No. | $R_c$ | $R_a$ | $R_b$ |
|---|---|---|---|
| V-1 | H | H | —$C_4H_9$(t) |
| V-2 | H | H | —$C_{12}H_{25}$(n) |
| V-3 | H | H | —$CH_2CH_2COOC_8H_{17}$ |
| V-4 | Cl | H | —$C_5H_{11}$(t) |
| V-5 | Cl | H | —$CH_2CH_2COOC_8H_{17}$ |
| V-6 | H | —$C_4H_9$(sec) | —$C_4H_9$(t) |
| V-7 | H | —$C_5H_{11}$(t) | —$C_5H_{11}$(t) |
| V-8 | H | —$C_4H_9$(t) | —$CH_2CH_2COOC_8H_{17}$ |
| V-9 | H | —$CH_3$ | —$C_4H_9$(t) |
| V-10 | Cl | —$C_4H_9$(t) | —$C_4H_9$(t) |
| V-11 | Cl | —$C_4H_9$(sec) | —$C_4H_9$(t) |
| V-12 | Cl | —$C_4H_9$(t) | —$CH_2CH_2COOC_8H_{17}$ |
| V-13 | —$OCH_3$ | —$C_4H_9$(sec) | —$C_4H_9$(t) |
| V-14 | —$C_4H_9$(sec) | —$C_4H_9$(t) | —$CH_2CH_2COOC_8H_{17}$ |
| V-15 | —$C_6H_5$ | —$C_5H_{11}$(t) | —$C_5H_{11}$(t) |
| V-16 | H | H | —$C_{12}H_{25}$ |

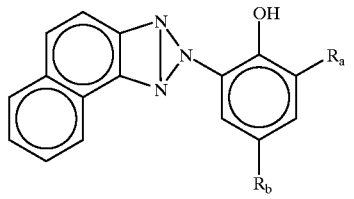

| | | | |
|---|---|---|---|
| V-17 | H | —$C_4H_9$(t) | —$C_4H_9$(t) |
| V-18 | H | H | —$CH_2CH_2COOC_8H_{17}$ |
| V-19 | H | H | —$C_{12}H_{25}$ |
| V-20 | Cl | —$C_4H_9$(t) | —$CH_2CH_2COOC_8H_{17}$ |

TABLE 3

Compounds of general formula [Vb]

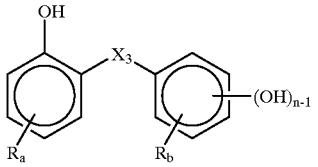

| No. | $X_3$ | $R_a$ | $R_b$ | n —(OH) |
|---|---|---|---|---|
| V-21 | —CO— | 5-$OC_4H_9$ | H | 1 |
| V-22 | " | 5-$OC_8H_{17}$ | H | 1 |
| V-23 | " | 5-$OC_{16}H_{33}$ | H | 1 |
| V-24 | " | 5-$OC_{18}H_{37}$ | H | 1 |
| V-25 | " | 4-$OC_4H_9$ | 4'-$CH_3$ | 3 2'-, 5'- |
| V-26 | " | 5-$COCH_3$ | 3'-$C_8H_{17}$ | 3 2'-, 6'- |
| V-27 | " | 5-$C_{12}H_{25}$ | 4'-$OCH_3$ | 2 2'-, |
| V-28 | " | 5-$COCH_3$ | 3'-$C_8H_{17}$ | 3 2'-, 6'- |
| V-29 | " | 4-$OC_{12}H_{25}$ | 4'-$OCH_2C_6H_4$-(p)$CH_3$ | 2 2'- |
| V-30 | " | 5-$C_8H_{17}$ | 4'-$COC_6H_4$-(p)$CH_3$ | 3 2'-, 6'- |

TABLE 3-continued

Compounds of general formula [Vb]

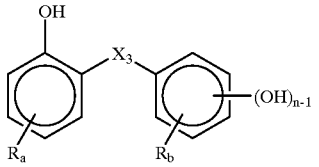

| No. | $X_3$ | $R_a$ | $R_b$ | n —(OH) |
|---|---|---|---|---|
| V-31 | —COO— | 4-$C_{12}H_{25}$ | 4'-$C_4H_9$(t) | 1 |
| V-32 | " | H | 4'-$C_4H_9$(t) | 1 |
| V-33 | " | 4-$OC_{12}H_{25}$ | 5'-$OCH_3$ | 2 2'- |
| V-34 | " | 3-$OCH_3$ | 5'-$OC_{12}H_{25}$ | 2 2'- |

In the present invention, the ultraviolet light absorbers may be added to any layer of the light-sensitive material. Namely, the ultraviolet light absorbers may be added to the emulsion layers, the interlayers, the protective layers or the support. It is particularly preferred that the ultraviolet light absorbers are added to the upper silver halide emulsion layer which is the farthest of any emulsion layer from the support. It is also preferred that the ultraviolet light absorbers are added to both the above-described upper silver halide emulsion-layer and a layer above the emulsion layer to stabilize an image.

The ultraviolet light absorbers may be added alone or in combination with the high-boiling organic solvents, the water-insoluble polymers and other photographic additives. It is preferred that the ultraviolet light absorbers are used in such an amount as to give a transmittance of not higher than 60%, more preferably not higher than 40%, at 380 nm when coated on a transparent base.

The compounds of general formula (IV) according to the present invention are illustrated in more detail below.

In general formula (IV), $R_1$, $R_2$, $R_3$ and $R_4$ each represents a hydrogen atom, an aliphatic group, an aromatic group, an aliphatic oxycarbonyl group (e.g., dodecyloxycarbonyl, allyloxycarbonyl), an aromatic oxycarbonyl group (e.g., phenoxycarbonyl) or a carbamoyl group (e.g., tetradecylcarbamoyl, phenylmethylcarbamoyl) with the proviso that all of $R_1$, $R_2$, $R_3$ and $R_4$ are not a hydrogen atom simultaneously. The total number of carbon atoms in $R_1$ to $R_4$ is 8 to 60.

The above aliphatic group is a straight-chain, branched or cyclic aliphatic hydrocarbon group including a saturated or unsaturated group such as an alkyl group, an alkenyl group and an alkynyl group. Typical examples of the aliphatic group include methyl, ethyl, butyl, dodecyl, octadecyl, eicosenyl, isopropyl, tert-butyl, tert-octyl, tert-dodecyl, cyclohexyl, cyclopentyl, allyl, vinyl, 2-hexadecenyl and propargyl.

The above aromatic group has preferably 6 to 42 carbon atoms and is preferably a substituted or unsubstituted phenyl or naphthyl group.

The aliphatic group and the aromatic group stated above may be substituted by one or more members such as an alkyl group, an aryl group, a heterocyclic group, an alkoxy group (e.g., methoxy, 2-methoxyethoxy), an aryloxy group (e.g., 2,4-di-tert-amylphenoxy, 2-chlorophenoxy, 4-cyanophenoxy), an alkenyloxy group (e.g., 2-propenyloxy), an acyl group (e.g., acetyl, benzoyl), an ester group (e.g., butoxycarbonyl, phenoxycarbonyl, acetoxy, benzoyloxy, butoxysulfonyl toluenesulfonyloxy), an amido group (e.g., acetylamino, ethyl-carbamoyl, dimethylcarbamoyl, methanesulfonamido, butylsulfamoyl), a sulfamido group (e.g., succinimido, hydantoinyl), a ureido group (e.g., phenylureido, dimethyl-ureido), an aliphatic or aromatic sulfonyl group (e.g., methanesulfonyl, phenylsulfonyl), an aliphatic or aromatic thio group (e.g., ethylthio, phenylthio) , a hydroxyl group, a cyano group, a caboxyl group, a nitro group, a sulfo group and a halogen atom.

Specific examples of the compounds of general formula (IV) include, but are not limited to, the following compounds:

(IV-1)

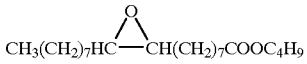

(IV-2)

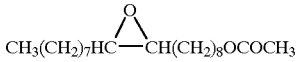

(IV-3)

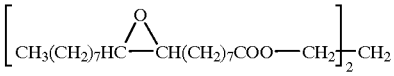

(IV-4)

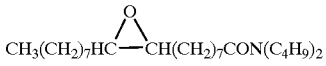

(IV-5)

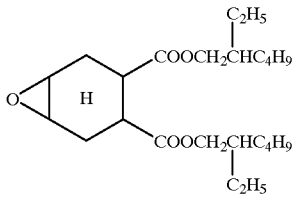

(IV-6)

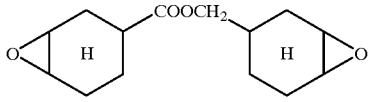

(IV-7)

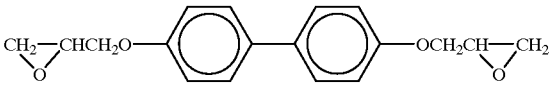

(IV-8)

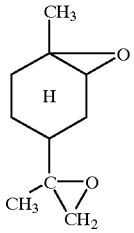

(IV-9)

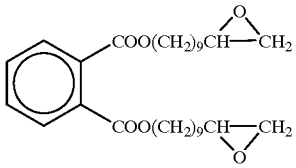

-continued (IV-10)

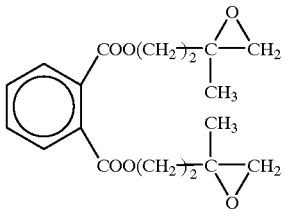

(IV-11)

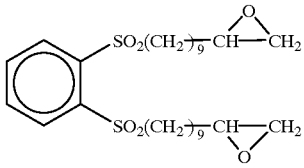

(IV-12)

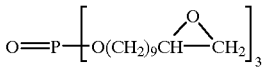

(IV-13)

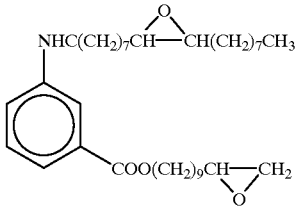

(IV-14)

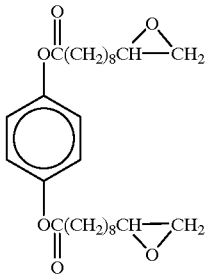

(IV-15)

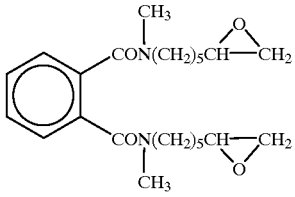

(IV-16)

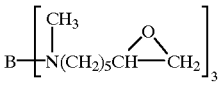

(IV-17)

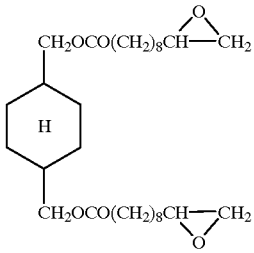

-continued (IV-18)

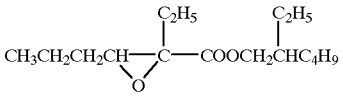

(IV-19)

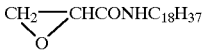

(IV-20)

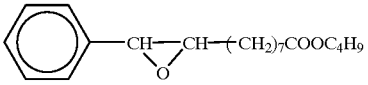

The compounds of general formula (IV) according to the present invention can be synthesized by using the method described in Example 1 of U.S. Pat. No. 4,540,657.

The compounds of general formula (IV) alone or together with the epoxy compounds having groups of general formula (AO) and yellow couplers can be emulsified and dispersed in a hydrophilic binder such as an aqueous gelatin solution by using a surfactant. The compounds of general formula (IV) are used in an amount of preferably 10 to 1000% by weight, more preferably 100 to 600% by weight, based on the weight of the epoxy compound having groups of general formula (AO).

The term "light-sensitive" or "non-sensitive" is to be understood to mean sensitivity to not only visible light but also to electromagnetic waves in the region of infrared rays. The color photographic material of the present invention comprises a support having thereon at least one yellow color forming a silver halide emulsion layer, at least one magenta color forming a silver halide emulsion layer and at least one cyan color forming a silver halide emulsion layer.

Generally, these layers are arranged in order of the yellow color forming silver halide emulsion layer, the magenta color forming silver halide emulsion layer and the cyan color forming silver halide emulsion layer, from the support side.

When emulsions sensitive to visible light are used, color reproduction by subtractive color photography can be obtained by including silver halide emulsions having sensitivity in the region of each wavelength and dyes which have complementary colors to light to be exposed, that is, a yellow coupler to blue, a magenta coupler to green and a cyan coupler to red. However, the relationship between the light-sensitive layer and the hue of the developed color may be different from that described above.

It is preferred that for the purpose of rapid processing that there are used silver halide emulsions comprising silver chloride or silver chlorobromide containing substantially no silver iodide (silver iodide content of less than 2 mol %) and having a silver chloride content of not less than 90 mol %, more preferably not less than 95 mol %, particularly preferably not less than 98 mol %.

The halogen composition of the emulsion may be different between grains, or grains may have the same halogen composition. However, when emulsions comprising grains having the same halogen composition are used, photographic performance between grains can be easily made uniform and hence the use of such emulsions is preferred. Further, with regard to halogen composition distribution in the interiors of the silver halide emulsion grains, there can be used: uniform structure type of grain wherein silver halide grains have the same composition throughout the whole grain; laminate structure type grains wherein the core in the interior of silver halide grain is different in halogen composition from the shell (single layer or multi-layer) which surrounds the core; and grains having such a structure in which a different silver composition exists in a non-laminar form in the interior of the grain or on the surface thereof (when the part exists on the surface of the grain, the grain has a structure such that the part having a different halogen composition is bonded to the edge, corner or plane of the grain). These grains can be properly chosen according to purpose. It is advantageous that any one of the latter two types rather than the uniform structure type grain be used to obtain high sensitivity. The latter two types are also preferred from the viewpoint of pressure sensitivity.

When the silver halide grains have such a structure as described above, a boundary between the parts having different halogen compositions from each other may be clear or an indistinct boundary wherein a mixed crystal is formed by the difference in halogen compositions. Further, the boundary may be such a structure that the composition is continuously changed.

In the high silver chloride emulsions, a structure is preferred in which silver bromide rich phases are localized in a laminar or non-laminar form in the interiors of silver halide grains and/or on the surfaces thereof. With regard to the halogen composition of the localized phases, the silver bromide content thereof is preferably at least 10 mol %, more preferably higher than 20 mol %. The localized phases may exist in the interiors of the grains and on the edges, corners or planes of the surfaces of the grains. However, it is particularly preferred that the localized phases exist on the corners of the grains.

There can be preferably used uniform structure type grains wherein the halogen composition distribution in the grains is small to inhibit a lowering in sensitivity when pressure is applied to the light-sensitive material.

Silver halide grains contained in the silver halide emulsions of the present invention have a mean grain size (the diameter of the grain is defined as the diameter of a circle having an area equal to the projected area of the grain, and the average of the diameters of the grains is referred to as mean grain size) of preferably 0.1 to 2 $\mu$m.

The coefficient of variation (obtained by dividing the standard deviation of a grain size distribution by the mean grain size) in the grain size distribution is not higher than 20%, preferably not higher than 15%, more preferably not higher than 10%, most preferably not higher than 7%. Namely, a monodisperse system is preferred. It is often preferred that a blend of monodisperse emulsions is added to the same layer or the monodisperse emulsions are coated in the form of a multi-layer to obtain a wide latitude.

The silver halide grains of the present invention may have a regular crystal form such as cube, tetradecahedron or octahedron, an irregular crystal form such as sphere or platy form or a complex form of these crystal forms. A mixture of grains having various crystal forms may be used. In the present invention, it is preferred that grains have such a grain size distribution in which at least 50%, preferably at least 70%, more preferably at least 90%, of grains are composed of grains having the aforesaid crystal forms.

Further, there can be preferably used emulsions wherein tabular grains having an average aspect ratio (diameter in terms of a circle/thickness) of .not lower than 5, preferably not lower than 8, account for more than 50% of the projected area of the entire grains.

Emulsions which can be used in the present invention can be prepared by using the methods described in P. Glafkides, Chimie et Phisique Photographiue (Paul Montel 1967); G. F.

Duffin, Photographic Emulsion Chemistry (Focal Press 1966); and V. L. Zelikman et al., Making and Coating Photographic Emulsion (Focal Press 1966). Namely, an acid process, a neutral process or an ammonia process can be used. A soluble silver salt can be reacted with a halide by the single jet process, the double jet process or a combination thereof. A reverse mixing method wherein grains are formed in the presence of an excess of silver ion can be used. One type of the double jet process that can be used is a controlled jet process wherein the pAg in the liquid phase in which silver halide is formed is kept constant. According to this process there can be obtained a silver halide emulsion in which the crystal form is regular and the grain size is nearly uniform.

Various polyvalent metal ion impurities can be introduced into the silver halide emulsions of the present invention during the course of formation of the emulsion grains or physical ripening thereof to increase sensitivity or to improve reciprocity law characteristics, temperature and humidity dependence during exposure, or latent image preservability. Examples of compounds which can be used therefor include salts of cadmium, zinc, lead, copper and thallium and salts and complex salts of Group VIII elements such as iron, ruthenium, rhodium, palladium osmium, iridium and platinum. The Group VIII elements are particularly preferred. The amounts of these compounds to be used widely vary depending on purpose, but are preferably $10^{-9}$ to $10^{-2}$ mol per mol of silver halide.

The silver halide emulsions of the present invention are subjected to chemical sensitization and spectral sensitization.

Chemical sensitization includes sulfur sensitization (typically the use of amorphous sulfur compounds), selenium sensitization, noble metal sensitization such as gold sensitization, and reduction sensitization. These sensitization methods may be used either alone or in combination.

Spectral sensitization is carried out to impart spectral sensitivity in a desired wavelength region of light to the emulsion in each layer of the light-sensitive material of the present invention. It is preferred that spectral sensitization is carried out by adding dyes which absorb light in a wavelength region corresponding to the desired spectral sensitivity, that is, by adding spectral sensitizing dyes. Examples of the spectral sensitizing dyes which can be used in the present invention include those described in F. M. Harmer, Heterocyclic Compounds-Cyanine Dyes and Related Compounds (John Wiley & Sons, New York, London 1964). The specific compounds and spectral sensitization methods described in JP-A-62-215272 (right upper column of page 22 to page 38) can be preferably used in the present invention.

Various compounds or precursors thereof can be added to the silver halide emulsions of the present invention to prevent the light-sensitive materials from being fogged during the course of the preparation, storage or photographic processing thereof or to stabilize photographic performance. Preferred examples of the compounds are described in the aforesaid JP-A-62-215272 (pp. 39–72).

The emulsions of the present invention may be a surface latent image emulsion wherein a latent image is predominantly formed on the surface of the grain and internal latent image type emulsions wherein a latent image is predominantly formed in the interior of the grain.

Gelatin which is used in the present invention is preferably deionized. Usually, gelatin contains a large amount of calcium ion, often 5000 ppm or more. It is preferred that deionized gelatin containing not more than 500 ppm of calcium ion is used in the present invention. The deionized gelatin is used in an amount of preferably at least 10% by weight, more preferably at least 20% by weight, particularly preferably at least 50% by weight, based on the total amount of all the gelatins. Such deionized gelatin may be added to any layer.

It is preferred that dyes (particularly oxonol dyes) capable of being decolorized by the processing described in European Patent 0,337,490A2 (pp. 27–76) are added to the hydrophilic colloid layers of the light-sensitive materials of the present invention in such an amount as to give an optical reflection density of not lower than 0.70 at 680 nm, or at least 12% by weight (more preferably at least 14% by weight) of titanium oxide surface-treated with a bivalent to tetravalent alcohol (e.g., trimethylol ethane) is incorporated into the water-resistant layer of the support to improve the sharpness, etc., of the image.

It is preferred that photographic additives such as cyan, magenta and yellow couplers are dissolved in high-boiling organic solvents. Any compound can be used as a high-boiling organic solvent, so long as the compound has a melting point of not higher than 100° C. and a boiling point of not lower than 140° C. and are water-immiscible and good solvents for couplers. The boiling points of the high-boiling organic solvents are preferably not lower than 160° C. and more preferably not lower than 170° C.

The details of these high-boiling organic solvents are described in JP-A-62-215272 (right lower column of page 137 to right upper column of page 144).

Further, cyan, magenta or yellow couplers may be impregnated with loadable latex polymers (e.g., those described in U.S. Pat No. 4,203,716) in the presence or absence of the high-boiling organic solvent, or are dissolved together with water-insoluble, organic solvent-soluble polymers and can be emulsified and dispersed in an aqueous solution of hydrophilic colloid.

Preferably, homopolymers or copolymers described in U.S. Pat No. 4,857,449 (7th to 15th columns) and PCT WO88/00723 can be used. The use of methacrylate or acrylamide polymers, particularly acrylamide polymers is more preferred from the viewpoint of the stabilization of dye images.

It is preferred that the dye image preservability improving compounds described in European Patent 0,277,589A2 together with couplers, particularly pyrazoloazole couplers, are used in the light-sensitive materials of the present invention.

Namely, it is preferred from the viewpoint of preventing stain from being formed by the formation of developed color by the reaction of couplers with a color developing agent or the oxidation product thereof left behind in the layers during storage after processing and preventing other side effects from being caused, that a compound (F) and/or a compound (G) singly or in combination are/is used. Compound (F) is chemically bonded to an aromatic amine developing agent left behind after color development to form a compound which is chemically inert and substantially colorless, and said compound (G) is chemically bonded to the oxidation product of an aromatic amine color developing agent left behind after color development to form a compound which is chemically inert and substantially colorless.

It is also preferred that the antifungal agents described in JP-A-63-271247 are added to the light-sensitive materials of the present invention to prevent various molds or bacteria from growing in the hydrophilic colloid layers and deteriorating the image.

Examples of supports which can be used for the light-sensitive materials of the present invention include white polyester supports for display and supports in which a layer containing a white pigment is provided on the silver halide emulsion layer side of the support. Further, it is preferred that an antihalation layer is coated on the silver halide emulsion layer side of the support or on the back side thereof. It is preferred that the transmission density of the support is set in the range of 0.35 to 0.8 so that display can be enjoyed by both reflected light and transmitted light.

The light-sensitive materials of the present invention may be exposed to visible light or infrared light. The exposure method may be a low-illumination exposure or a high-illumination exposure. In the latter case, a laser scanning exposure system wherein the exposure time per one pixel is shorter than $10^{-4}$ sec. is preferred It is preferred that when exposure is conducted, band stop filter described in U.S. Pat. No. 4,880,726 is used, whereby light color mixing can be removed and color reproducibility can be greatly improved.

It is preferred that after exposure, the color photographic materials of the present invention are subjected to color development, bleaching-fixing and rinsing treatment (or stabilizing treatment). Bleaching and fixing may be carried out with one bath as described above or may be separately carried out. The processing time of the color photographic materials of the present invention taken from color development to rinsing treatment (or stabilizing treatment) is within 4 minutes, preferably within 3 minutes.

Silver halide emulsions, other materials (e.g., additives), photographic constituent layers (e.g., layer arrangement), processing methods and processing additives described in the following patent specifications, particularly European Patent 0,355,660A2 (JP-A-2-139544) can be preferably applied to the light-sensitive materials of the present invention.

| Photographic constituent element, etc. | JP-A-62-215272 | JP-A-2-33144 | EP 0,355,660A2 |
|---|---|---|---|
| Silver halide emulsion | Line 6 of right upper column of p. 10 to line 5 of left lower column of p. 12; and line 4 from the bottom of p. 12 to line 17 of left upper column of p. 13 | Line 16 of right upper column of p. 28 to line 11 of right lower column of p. 29; and line 2 to line 5 of p. 30 | Line 53 of p. 45 to line 3 of p. 47; and line 20 to line 22 of p. 47 |
| Solvent for silver halide | Line 6 to line 14 of left lower column of p. 12; and line 3 from the bottom of left upper column of p. 13 to the bottom of left lower column of p. 18 | — | — |
| Chemical sensitizing agent | Line 3 of left lower column to line 5 from the bottom of right lower column of p. 12; and line 1 of right lower column of p. 18 to line 9 from the bottom of right upper column of p. 22 | Line 12 to the bottom of right lower column of p. 29 | Line 4 to Line 9 of p. 47 |
| Spectral sensitizing dye (spectral sensitizing method) | Line 8 from the bottom of right upper column of p. 22 to the bottom of p. 38 | Line 1 to line 13 of left upper column of p. 30 | Line 10 to line 15 of p. 47 |
| Emulsion stabilizer | Line 1 of left upper column of p. 39 to the bottom of right upper column of p. 72 | Line 14 of left upper column to line 1 of right upper column of p. 30 | Line 16 to line 19 of p. 47 |
| Development accelerator | Line 1 of left lower column of p. 72 to line 3 of right upper column of p. 91 | — | — |
| Color coupler (cyan, magenta, yellow coupler) | Line 4 of right upper column of p. 91 to line 6 of left upper column of p. 121 | Line 14 of right upper column of p. 3 to the bottom of left upper column of p. 18; and line 6 of right upper column of p. 30 to line 11 of right lower column of p. 35 | Line 15 to line 27 of p. 4; line 30 of p. 5 to the bottom of p. 28; line 29 to line 31 of p. 45; and line 23 of p. 47 to line 50 of p. 63 |
| Super—sensitizing agent | Line 7 of left upper column of p. 121 to line 1 of right upper column of p. 125 | — | — |
| Ultraviolet light absorber | Line 2 of right upper column of p. 125 to the bottom of left lower column of p. 127 | Line 14 of right lower column of p. 37 to line 11 of left upper column of p. 38 | Line 22 to line 31 of p. 65 |
| Anti-fading agent (image stabilizer) | Line 1 of right lower column of p. 127 to line 8 of left lower column of p. 137 | Line 12 of right upper column of p. 36 to line 19 of left upper column of p. 37 | Line 30 of p. 4 to line 23 of p. 5; line 1 of p. 29 to line 25 of p. 45; line 33 to line 40 of p. 45; and line 2 to line 21 of p. 65 |

-continued

| Photographic constituent element, etc. | JP-A-62-215272 | JP-A-2-33144 | EP 0,355,660A2 |
|---|---|---|---|
| High-boiling and/or low-boiling organic solvent | Line 9 of left lower column of p. 137 to the bottom of right upper column of p. 144 | Line 14 of right lower column of p. 35 to line 4 from the bottom of left upper column of p. 36 | Line 1 to line 51 of p. 64 |
| Dispersion method of photo-graphic additive | Line 1 of left lower column of p. 144 to line 7 of right upper column of p. 146 | Line 10 of right lower column of p. 27 to the bottom of left upper column of p. 28; and line 12 of right column of p. 35 to line 7 of right upper column of p. 36 | Line 51 of p. 63 to line 56 of p. 64 |
| Hardening agent | Line 8 of right upper column of p. 146 to line 4 of left lower column of p. 155 | — | — |
| Developing agent precursor | Line 5 of left lower column of p. 15 to line 2 of right lower column of p. 155 | | |
| Development restrainer releasing compounds | Line 3 to line 9 of right lower column of p. 155 | — | — |
| Support | Line 19 of right lower column of p. 155 to line 14 of left upper column of p. 156 | Line 18 of right upper column of p. 38 to line 3 of left upper column of p. 39 | Line 29 of p. 66 to line 13 of p. 67 |
| Constitution of light—sensitive layer | Line 15 of left upper column of p. 156 to line 14 of right lower column of p. 156 | Line 1 to line 15 of right upper column 8 of p. 28 | Line 41 to line 52 of p. 45 |
| Dye | Line 15 of right lower column of p. 156 to the bottom of right lower column of p. 154 | Line 12 of left lower column to line 7 of right upper column of p. 38 column | Line 18 to line 22 of p. 66 |
| Color mixing inhibitor | Line 1 of left upper column of p. 185 to line 3 of right lower column of p. 188 | Line 8 to line 11 of right upper column of p. 36 | Line 57 of p. 64 to line 1 of p. 65 |
| Gradation controller | Line 4 to line 8 of right lower column of p. 188 | — | |
| Anti-staining agent | Line 9 of right lower column of p. 188 to line 10 of right lower column of p. 193 | The bottom of left upper column to line 13 of right lower column of p. 37 | Line 32 of p. 65 to line 17 of p. 66 |
| Surfactant | Line 1 of left lower column of p. 201 to the bottom of right upper column of p. 210 | Line 1 of right upper column of p. 18 to the bottom of right lower column of p. 24; and line 10 from the bottom of left lower column to line 9 of right lower column | — |
| Fluorine-containing compound (as antistatic agent, coating aid, lubricant, sticking inhibitor, etc.) | Line 1 of left lower column of p. 210 to line 5 of left lower column of p. 222 | Line 1 of left upper column of p. 25 to line 9, right lower column of p. 27 | — |
| Binder (hydrophilic colloid) | Line 6 of left lower column of p. 222 to the bottom of left upper column of p. 225 | Line 8 to line 18 of right upper column of p. 38 | Line 23 to line 28 of p. 66 |
| Thickener | Line 1 of right upper column of p. 225 to line 2 of right upper column of p. 227 | — | — |
| Antistatic agent | Line 3 of right upper column of p. 227 to line 2 of left upper column of p. 23) | — | — |
| Polymer latex | Line 2 of left upper column of p. 230 to the bottom of p. 239 | — | — |
| Matting agent | Line 1 of left upper column of p. 240 to the bottom of right upper column of p. 240 | — | — |
| Photographic processing | Line 7 of right upper column of p. 3 to line 5 of right | Line 4 of left upper column of p. 39 to the bottom of | Line 14 of p. 67 to line 28 of p. 69 |

-continued

| Photographic constituent element, etc. | JP-A-62-215272 | JP-A-2-33144 | EP 0,355,660A2 |
|---|---|---|---|
| (processing stage, additives. etc.) | upper column of p. 10 | left upper column of p. 42 | |

Note:
The above cited passages of JP-A-62-215272 include the amended matters in the amendment dated March 16, 1987, which is attached to the end of the publication.

As cyan couplers, the above-described cyan couplers may be used together with the diphenylimidazole cyan couplers described in JP-A-2-33144, the 3-hydroxypyridine cyan couplers (particularly two equivalent type couplers formed by introducing a chlorine-eliminatable group into four equivalent type couplers such as coupler (42), and further couplers (6) and (9) are preferred) described in European Patent 0,333,185A2 or the cyclic active methylene cyan couplers (particularly couplers 3, 8 and 34 are preferred) described in JP-A-64-32260.

The processing methods described in JP-A-2-207250 (left upper column of page 27 to right upper column of page 34) can be preferably applied to the processing of the silver halide color photographic materials using high silver chloride emulsions having a silver chloride content of not lower than 90 mol %.

The present invention is now illustrated in greater detail by reference to the following examples which, however, are not to be construed as limiting the present invention in any way.

EXAMPLE 1

The following layers were coated on a paper support (both sides thereof were laminated with polyethylene) to prepare multi-layer color photographic paper. Coating solutions were prepared in the following manner.

Fifteen g of a yellow coupler (compound Y-31), 0.4 g of a compound of general formula (II) (compound II-10), 4.0 g of a dye image stabilizer (Cpd-1) and 2.0 g of a sodium dodecylbenzenesulfonate were added to 5.0 g of a solvent (Solv-1) and 25 cc of ethyl acetate to dissolve them. The resulting solution was emulsified and dispersed in a 10% aqueous solution of gelatin in a homogenizer.

Separately, the following blue-sensitive Sensitizing Dyes A and B were added to a silver chlorobromide Emulsion A (cubic, a 3:7 (by Ag molar ratio) mixture of a larger-size emulsion $B_1$ having a mean grain size of 0.88 $\mu$m and a smaller-size emulsion $B_2$; a coefficient of variation in grain size: 0.06 and 0.08, respectively; 0.3 mol % of silver bromide being localized on a part of the surface of the grain in each emulsion) ($2.0\times10^{-4}$mol of each of the Sensitizing Dyes A and B was added to the larger-size emulsion, and $2.5\times10^{-4}$ mol of each of the sensitizing dyes was added to the smaller-size emulsion, each amount being per mol of silver halide). The chemical ripening of the emulsion was carried out by adding a sulfur sensitizing agent and a gold sensitizing agent. The emulsion and the above emulsified dispersion were mixed and dissolved, and a coating solution for the first layer was prepared so as to give the following composition described as First Layer.

Coating solutions for the second layer through the seventh layer were prepared in the same manner as in the preparation of the coating solution for the first layer.

Sodium salt of 1-oxy-3,5-dichloro-s-triazine was used as a hardening agent for the gelatin in each layer. Further, Cpd-10 and Cpd-11 were added to each layer in such an amount as to give 25.0 mg/m$^2$ and 50.0 mg/m$^2$ in terms of the total amount.

The following spectral sensitizing dyes were used for the silver chlorobromide emulsion of each light-sensitive emulsion layer:

Blue-Sensitive Emulsion Layer

Sensitizing Dye A

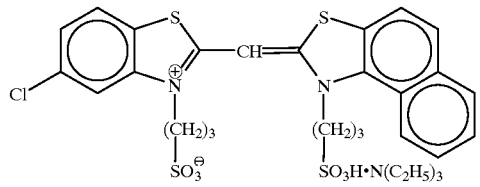

Sensitizing Dye B

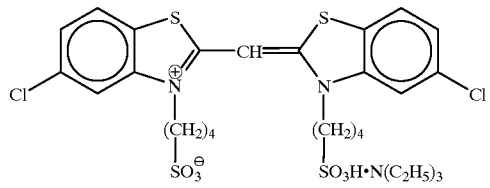

($2.0\times10^{-4}$ of each dye being added to the larger-size emulsion, and $2.5\times10^{-4}$ mol of each dye being added to the smaller-size emulsion, each amount being per mol of silver halide);

Green-Sensitive Emulsion Layer

Sensitizing Dye C

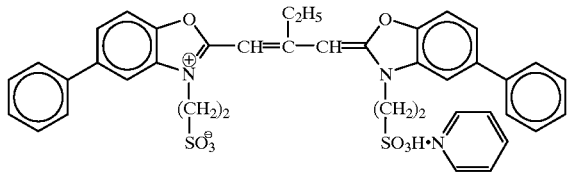

($4.0\times10^{-4}$ mol being added to the larger-size emulsion, and $5.6\times10^{-4}$ mol being added to the smaller-size emulsion, each amount being per mol of silver halide);

Sensitizing Dye D

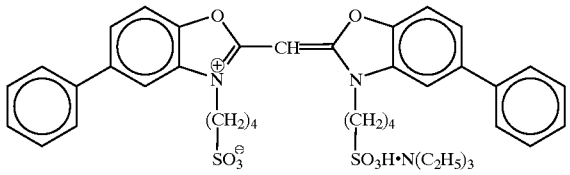

($7.0\times10^{-5}$ mol being added to the larger-size emulsion, and $1.0\times10^{-5}$ mol being added to the smaller-size emulsion, each amount being per mol of silver halide);

Red-Sensitive Emulsion Layer

Sensitizing Dye E

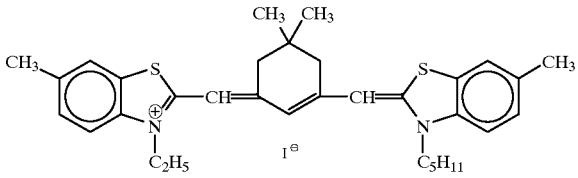

($0.9\times10^{-4}$ mol being added to the larger-size emulsion, and $1.1\times10^{-4}$ mol being added to the smaller-size emulsion, each amount being per mol of silver halide).

Further, $2.6\times10^{-3}$ mol of the following compound per mol of silver halide was added to the red-sensitive emulsion layer:

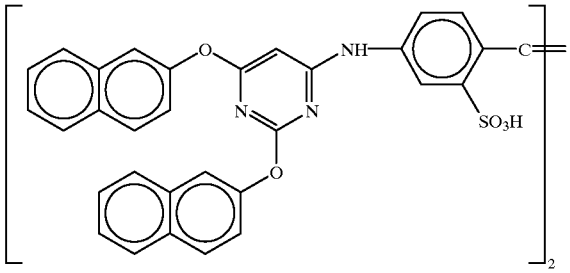

Further, $3.4\times10^{-4}$ mol, $9.7\times10^{-4}$ mol, and $5.5\times10^{-4}$ mol of 1-(5-methylureidophenyl)-5-mercaptotetrazole per mol of silver halide were added to the blue-sensitive emulsion layer, the green-sensitive emulsion layer and the red-sensitive emulsion layer, respectively. Furthermore, $1\times10^{-4}$ mol, $2\times10^{-4}$ mol of 4-hydroxy-6-methyl-1,3,3a,7-tetrazaindene per mol of silver halide were added to the blue-sensitive emulsion layer and the green-sensitive emulsion layer, respectively.

The following dyes (parenthesized numbers indicating coating weights) were added to the emulsion layers:

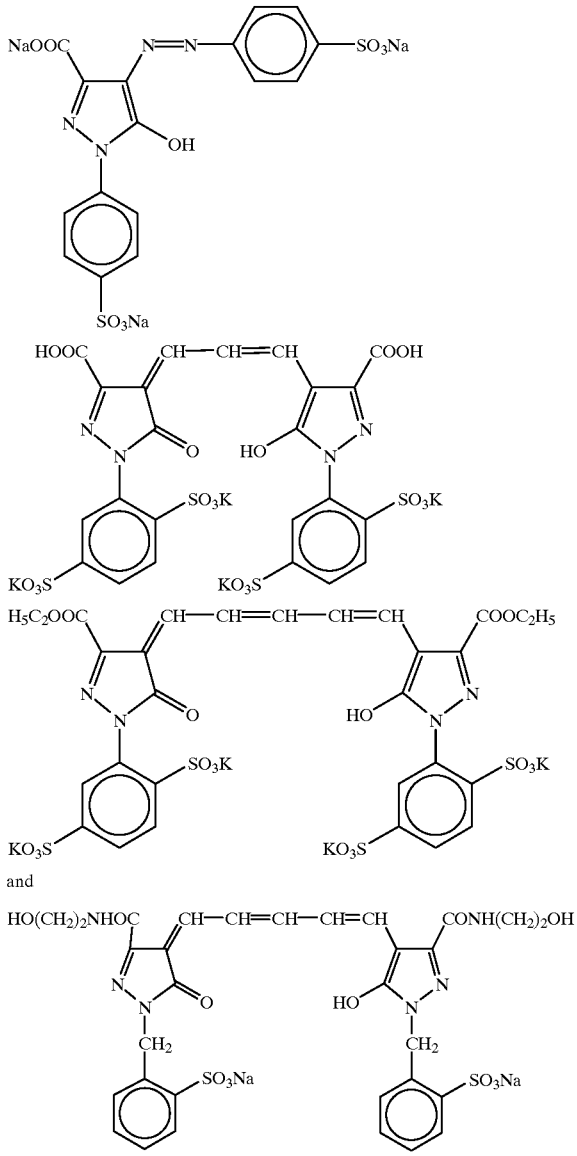

Layer Structure

Each layer had the following composition, The numbers represent coating weight ($g/m^2$), The amounts of the silver halide emulsions are coating weight in terms of silver.

Support

Polyethylene-laminated paper

[Polyethylene on the first layer side contained white pigment ($TiO_2$) and bluish dye (ultramarine)]

| First Layer (yellow color forming emulsion layer) | |
|---|---|
| The above silver chlorobromide emulsion | 0.27 |
| Gelatin | 1.36 |
| Yellow coupler (Compound Y-31) | 0.75 |
| Compound of formula (II) | 0.02 |
| (compound II-10) | 0.20 |

-continued

| | |
|---|---|
| Dye image stabilizer (Cpd-1) | 0.25 |
| Solvent (Solv-1) | |
| Second layer (color mixing inhibiting layer) | |
| | |
| (10 mg/m$^2$) | |
| (10 mg/m$^2$) | |
| (40 mg/m$^2$) | |
| (20 mg/m$^2$) | |
| Gelatin | 0.99 |
| Color mixing inhibitor (Cpd-4) | 0.08 |
| Solvent (Solv-7) | 0.02 |
| Solvent (Solv-2) | 0.25 |
| Solvent (Solv-3) | 0.25 |
| Third Layer (magenta color forming emulsion layer) | |
| | |
| Silver chlorobromide emulsion (cubic, a 6:4 (by Ag molar ratio) mixture of a larger-size emulsion $G_1$ having a mean grain size of 0.55 $\mu$m and a smaller-size emulsion $G_1$ having a mean grain size of 0.39 $\mu$m; a coefficient of variation in grain size distribution: 0.10 and 0.08; 0.8 mol of AgBr being localized on a part of the surface of the grain in each emulsion) | 0.13 |
| Gelatin | 1.45 |
| Magenta coupler (ExM) | 0.16 |
| Dye image stabilizer (Cpd-6) | 0.15 |
| Dye image stabilizer (Cpd-2) | 0.03 |
| Dye image stabilizer (Cpd-7) | 0.01 |
| Dye image stabilizer (Cpd-8) | 0.01 |
| Dye image stabilizer (Cpd-9) | 0.08 |
| Solvent (Solv-3) | 0.50 |
| Solvent (Solv-4) | 0.15 |
| Solvent (Solv-5) | 0.15 |
| Fourth Layer (color mixing inhibiting layer) | |
| | |
| Gelatin | 0.70 |
| Color mixing inhibitor (Cpd-4) | 0.04 |
| Solvent (Solv-7) | 0.01 |
| Solvent (Solv-2) | 0.18 |
| Solvent (Solv-3) | 0.18 |
| Fifth Layer (cyan color forming emulsion layer) | |
| | |
| Silver chlorobromide emulsion (cubic, a 7:3 (by Ag molar ratio) mixture of a larger-size emulsion $R_1$ having a mean grain size of 0.58 $\mu$m and a smaller-size emulsion $R_2$ having a mean grain size of 0.45 $\mu$m; a coefficient of variation in grain-size distribution: 0.09 and 0.11; 0.6 mol % of AgBr being localized on a part of the surface of the grain in each emulsion) | 0.20 |
| Gelatin | 0.85 |
| Cyan coupler (ExC) | 0.33 |
| Ultraviolet light absorber (UV-2) | 0.18 |
| Dye image stabilizer (Cpd-1) | 0.33 |
| Dye image stabilizer (Cpd-10) | 0.15 |
| Dye image stabilizer (Cpd-11) | 0.15 |
| Dye image stabilizer (Cpd-12) | 0.01 |
| Dye image stabilizer (Cpd-9) | 0.01 |
| Dye image stabilizer (Cpd-7) | 0.01 |
| Solvent (Solv-6) | 0.22 |
| Solvent (Solv-1) | 0.01 |
| Sixth Layer (ultraviolet light absorbing layer) | |
| | |
| Gelatin | 0.55 |
| Ultraviolet light absorber (UV-1) | 0.42 |
| Dye image stabilizer (Cpd-13) | 0.15 |
| Dye image stabilizer (Cpd-6) | 0.02 |
| Seventh layer (protective layer) | |
| | |
| Gelatin | 1.13 |
| Acrylic-modified copolymer of polyvinyl alcohol (a degree of modification: 17%) | 0.15 |
| Liquid paraffin | 0.03 |

-continued

| | |
|---|---|
| Dye image stabilizer (Cpd-14) | 0.01 |

The compounds used above are the following:

(ExM) Magenta coupler

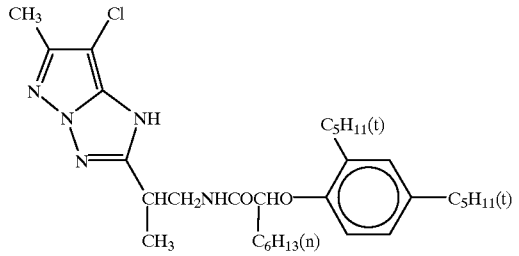

(ExM) Cyan coupler

3:7 (by mol) mixture

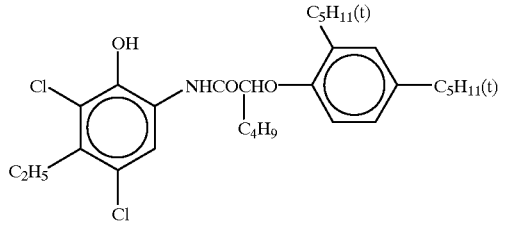

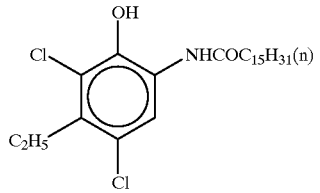

(Cpd-1) Dye image stabilizer

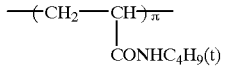

(Average MW: 60,000)

(Cpd-2) Dye image stabilizer

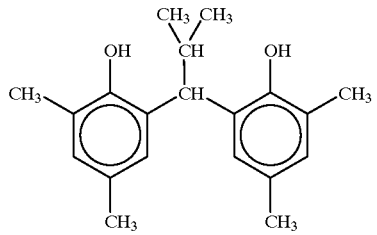

(Cpd-4) Color mixing inhibitor

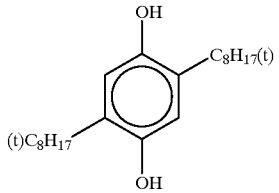

-continued (Cpd-6) Dye image stabilizer

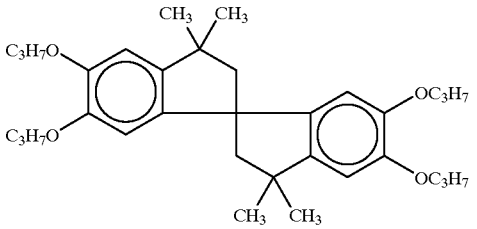

(Cpd-7) Dye image stabilizer

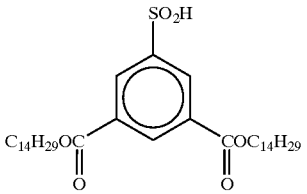

(Cpd-8) Dye image stabilizer

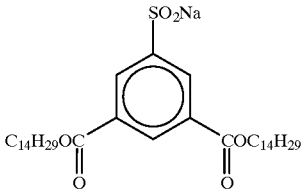

(Cpd-9) Dye image stabilizer

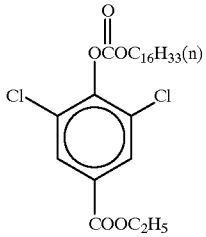

(Cpd-10) Dye image stabilizer

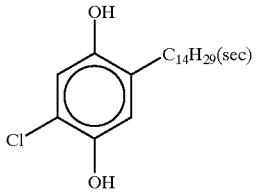

(Cpd-11) Dye image stabilizer

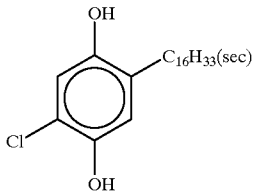

(Cpd-12) Dye image stabilizer

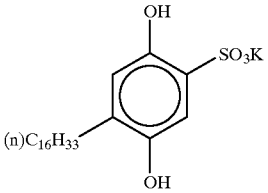

-continued (Cpd-13) Dye image stabilizer

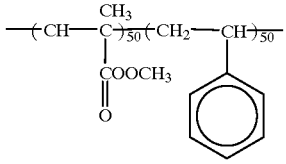

Average MW: about 60,000

(Cpd-14) Dye image stabilizer

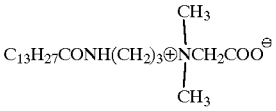

(Cpd-15) Antiseptic agent

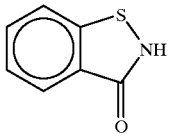

(Cpd-16) Antiseptic agent

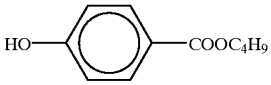

(UV-1) Ultraviolet light absorber

2:1:4:3 (by weight) mixture of (1), (2), (3) and (4)

(1)

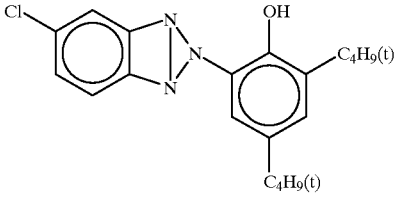

(2)

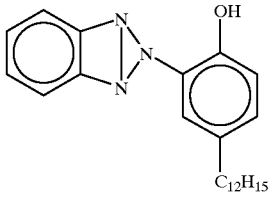

(3)

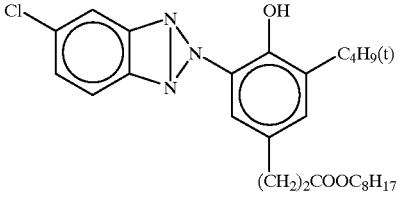

(4)

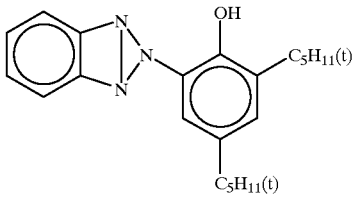

-continued (UV-2) Ultraviolet light absorber

1:2:2 (by weight) mixture of (1), (2), and (3)

(1)

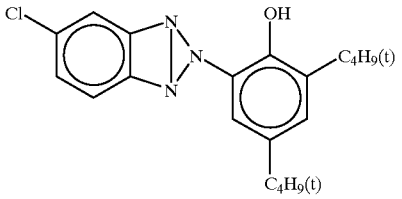

(2)

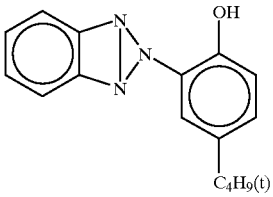

(3)

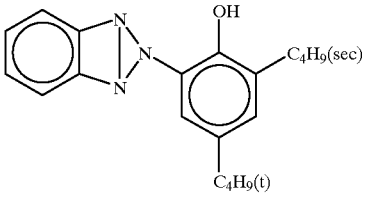

(Solv-1) Solvent

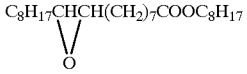

(Solv-2) Solvent

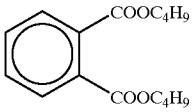

(Solv-3) Solvent

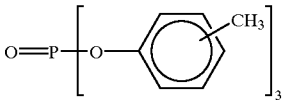

(Solv-4) Solvent

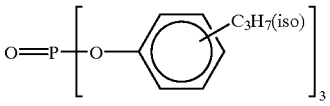

(Solv-5) Solvent

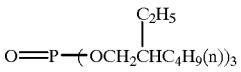

(Solv-6) Solvent

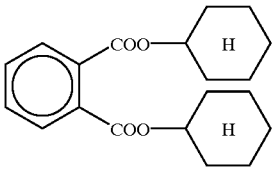

-continued (Solv-7) Solvent

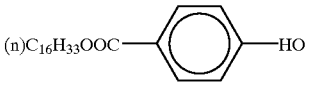

The thus-obtained sample was referred to as Sample 101.

Samples 102 to 117 were prepared in the same manner as in the preparation of Sample 101, except that the compositions of compounds in each layer were changed as indicated in Table 4.

Sample 101 was subjected to gray exposure so as to allow about 30% of the amount of silver coated to be developed by using a sensitometer (FWH type, color temperature of light source: 3200° K, manufactured by Fuji Photo Film Co., Ltd.).

After completion of exposure, the exposed sample was subjected to continuous processing by using a paper processor and the following processing solutions having the following compositions in the following processing stages to prepare the processed state of running equilibrium state.

| Processing Stage | Temp. | Time | Replenisher* | Tank capacity |
|---|---|---|---|---|
| Color development | 35° C. | 45 sec | 161 ml | 171 |
| Bleach-fixing | 30–35° C. | 45 sec | 215 ml | 171 |
| Rinse | 30° C. | 90 sec | 350 ml | 101 |
| Drying | 70–80° C. | 60 sec | | |

*Replenishment rate being per $m^2$ of light-sensitive material

Each processing solution had the following composition.

| | Tank Solution | Replenisher |
|---|---|---|
| Color developer solution | | |
| Water | 800 ml | 800 ml |
| Ethylenediamine-N,N,N',N'-tetramethylenephosphonic acid | 1.5 g | 2.0 g |
| Potassium bromide | 0.015 g | — |
| Triethanolamine | 8.0 g | 12.0 g |
| Sodium chloride | 1.4 g | — |
| Potassium carbonate | 25 g | 25 g |
| N-Ethyl-N-(β-methanesulfonamidoethyl)-3-methyl-4-aminoaniline sulfate | 5.0 g | 7.0 g |
| N,N-Di(carboxymethyl)-hydrazine | 4.0 g | 5.0 g |
| N,N-Di(sulfoethyl)-hydroxylamime mono Na salt | 4.0 g | 5.0 g |
| Fluorescent brightener (WHITEX 4B manufactured by Sumitomo Chemical Co., Ltd.) | 1.0 g | 2.0 g |
| Add water to make | 1000 ml | 1000 ml |
| pH (25° C.) | 10.05 | 10.45 |

| Bleach-fixing solution (Tank solution and replenisher being the same) | |
|---|---|
| Water | 400 ml |
| Ammonium thiosulfate (700 g/l) | 100 ml |
| Sodium sulfite | 17 g |
| Ammonium ethylenediaminetetraacetato ferrate (III) | 55 g |
| Disodium ethylenediaminetetracetate | 5 g |
| Ammonium bromide | 40 g |

-continued

| | |
|---|---|
| Add water to make | 1000 ml |
| pH (25° C.) | 6.0 |

Rinsing Solution (Tank solution and replenisher being the same)

Ion exchanged water (the concentration of each of calcium ion and magnesium ion being reduced to not higher than 3 ppm).

The relative residual density [$D/D_0$(%)] to an initial density after fading at an initial density of 1.0 was calculated. A rise in stain on the white ground was determined by measuring the increase in (ΔDy-min) yellow density.

(c) Yellow color developability

Maximum density (Dmax) in developed yellow color areas was measured by using X-rite densitometer.

The results of the evaluation of Samples 101 to 117 are shown in Table 4.

TABLE 4

| Sample | Compound of formula (II) | | Amount of ultraviolet light absorber used | | White ground after | Fastness to light | | Color develop-ability | |
|---|---|---|---|---|---|---|---|---|---|
| No | type | amount | 5th layer | 6th layer | processing | $D/D_0$ (%) | ΔDy-min | Dmax | Remarks |
| 101 | II-10 | 0.02 | 0.18 | 0.42 | ○ | 87 | 0.01 | 2.47 | Invention |
| 102 | II-10 | 0.04 | 0.18 | 0.42 | ○ | 90 | 0.01 | 1.44 | Invention |
| 103 | II-10 | 0.06 | 0.18 | 0.42 | ○ | 93 | 0.01 | 2.38 | Invention |
| 104 | — | — | — | — | ○ | 50 | 0.08 | 2.50 | Comp. Ex. |
| 105 | II-10 | 0.02 | — | — | ○ | 60 | 0.07 | 2.47 | Comp. Ex. |
| 106 | II-10 | 0.04 | — | — | ○ | 67 | 0.06 | 2.44 | Comp. Ex. |
| 107 | II-10 | 0.06 | — | — | ○ | 70 | 0.05 | 2.38 | Comp. Ex. |
| 108 | — | — | 0.18 | 0.21 | ○ | 58 | 0.07 | 2.50 | Comp. Ex. |
| 109 | — | — | 0.18 | 0.42 | ○ | 62 | 0.06 | 2.50 | Comp. Ex. |
| 110 | — | — | 0.18 | 0.84 | Δ | 65 | 0.05 | 2.50 | Comp. Ex. |
| 111 | — | — | 0.18 | 1.26 | X | 67 | 0.05 | 2.50 | Comp. Ex. |
| 112 | Comparative compound* | 0.02 | — | — | ○ | 53 | 0.07 | 2.40 | Comp. Ex. |
| 113 | Comparative compound* | 0.04 | — | — | ○ | 56 | 0.06 | 2.20 | Comp. Ex. |
| 114 | Comparative compound* | 0.06 | — | — | ○ | 58 | 0.05 | 2.02 | Comp. Ex. |
| 115 | Comparative compound* | 0.02 | 0.18 | 0.42 | ○ | 63 | 0.06 | 2.40 | Comp. Ex. |
| 116 | Comparative compound* | 0.04 | 0.18 | 0.42 | ○ | 65 | 0.05 | 2.20 | Comp. Ex. |
| 117 | Comparative compound* | 0.06 | 0.18 | 0.42 | ○ | 67 | 0.05 | 2.02 | Comp. Ex. |

*Comparative compound

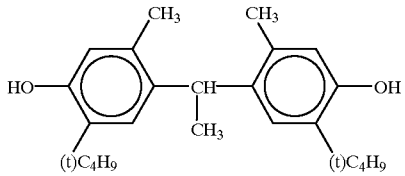

(described in JP-B-48-31625)

Note: Amount of compound in Table is $g/m^2$

Each of Samples 101 to 117 was subjected to gradation exposure through a three color separation filter for sensitometry by using a sensitometer (FWH type manufactured by Fuji Photo Film Co., Ltd.) and then subjected to color development in the above-described processing stages.

The samples processed in the manner described above were evaluated in the following manner:

(a) White ground after processing

The processed samples were randomly arranged, and yellowing on the white ground was organoleptically evaluated in the following three grades:

O: unnoticed

Δ: noticeable, but acceptable

X: not acceptable (b) Fastness to light

An under glass outdoor exposure stand was used, and a fading test was carried out under sunlight for two months.

It will be understood from Table 4 that fastness to light is improved by using either a compound of formula (II) alone or an ultraviolet light absorber alone (Sample Nos. 104 to 114), in comparison with the case where neither the compound of formula (II) nor the ultraviolet light absorber is added or the cases in which comparative bisphenol compounds are used. When comparative bisphenol compounds are used, color developability is greatly lowered. Even when the amount of the ultraviolet light absorber is increased in the case of the use of the ultraviolet light absorber alone, an effect of improving fastness to light is saturated and the degree of yellowing on the white ground is not acceptable.

On the other hand, when a compound of formula (II) and an ultraviolet light absorber are used in combination (Sample Nos. 101 to 103), fastness to light can be greatly improved in comparison with the case where a compound of formula (II) alone or an ultraviolet light absorber alone is used. Accordingly, it can be seen that an effect of remarkably improved fastness to light can be obtained by using a compound of formula (II) and an ultraviolet light absorber in combination.

A similar effect could be obtained when the Compound II-13 or II-23 was used in place of the Compound II-10 in the samples of the present invention.

EXAMPLE 2

Sample Nos. 201 to 214 were prepared in the same manner as in the preparation of Sample No. 101 of Example 1, except that a 1:1 (by weight) mixture of yellow couplers Y-31 and Y-2 was used in place of the yellow coupler used in Sample No. 101, ultraviolet light absorber UV-3 was used in place of the ultraviolet light absorber used in the sixth layer of Sample No. 101, and further compounds indicated in Table 5 were used in the amounts shown. In the same manner as in Example 1, processing and evaluation were made. The results are shown in Table 5.

-continued (3)

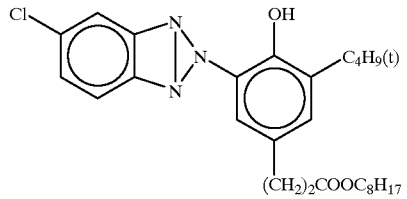

(4)

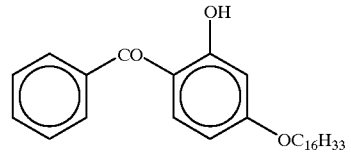

TABLE 5

| Sample | Compound of formula (II) | | Amount of ultraviolet light absorber used | | Epoxy compound of invention | | Fastness to light | Color develop-ability | |
|---|---|---|---|---|---|---|---|---|---|
| No. | type | amount | 5th layer | 6th layer | type | amount | $D/D_0$ (%) | Dmax | Remarks |
| 201 | II-10 | 0.06 | — | — | — | — | 65 | 2.42 | Comp. Ex. |
| 202 | II-4 | 0.06 | — | — | — | — | 63 | 2.40 | Comp. Ex. |
| 203 | — | — | 0.22 | 0.38 | — | — | 60 | 2.54 | Comp. Ex. |
| 204 | — | — | — | — | — | — | 48 | 2.54 | Comp. Ex. |
| 205 | II-10 | 0.06 | 0.22 | 0.38 | — | — | 90 | 2.42 | Invention |
| 206 | II-4 | 0.06 | 0.22 | 0.38 | — | — | 90 | 2.40 | Invention |
| 207 | II-10 | 0.06 | 0.22 | 0.38 | A-35* | 0.10 | 92 | 2.55 | Invention |
| 204 | II-4 | 0.06 | 0.22 | 0.38 | A-35* | 0.20 | 92 | 2.55 | Invention |
| 209 | II-10 | 0.06 | 0.22 | 0.38 | A-34* | 0.10 | 92 | 2.55 | Invention |
| 210 | II-4 | 0.06 | 0.22 | 0.38 | A-34* | 0.20 | 91 | 2.54 | Invention |
| 211 | II-23 | 0.06 | 0.22 | 0.38 | A-10 | 0.10 | 90 | 2.54 | Invention |
| 212 | II-10 | 0.06 | 0.22 | 0.38 | A-18 | 0.10 | 92 | 2.55 | Invention |
| 213 | II-10 | 0.06 | 0.22 | 0.38 | A-36* | 0.10 | 91 | 2.55 | Invention |
| 214 | II-10 | 0.06 | 0.22 | 0.38 | A-48 | 0.10 | 91 | 2.55 | Invention |

Note:
The amount of the compound in Table is $g/m^2$.
*In A-34, A-35 and A-36, x is 7.5

(UV-3) Ultraviolet light absorber

2:2:3:3 (by weight) mixture of (1), (2), (3) and (4)

(1)

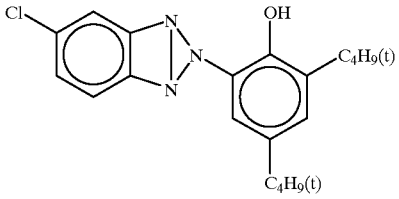

(2)

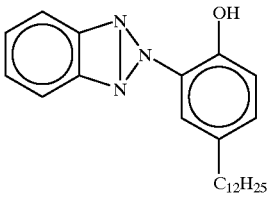

It can be seen from Table 5 that fastness to light can be greatly improved when a compound of formula (II) and an ultraviolet light absorber are used in combination (Sample Nos. 205 and 206). Further, when the epoxy compound of the present invention is used together therewith, the problem with regard to a lowering in the developability of yellow coupler caused by the compound of formula (II) can be solved, and a high color density can be obtained (Sample Nos. 207 to 214).

EXAMPLE 3

Samples were prepared in the same manner as in the preparation of Sample No. 207 of Example 2, except that an equal weight of yellow coupler Y-2, Y-6, Y-12, Y-20 or Y-34 was used in respective samples in place of Y-31. In the same manner as in Example 2, evaluation was made. It was found that when a compound of formula (II) and an ultraviolet light absorber were used in combination, fastness to light could be greatly improved. Further, when the epoxy compound was used, color developability was good.

EXAMPLE 4

The following layers having the following compositions were coated on a paper support (both sides of the support were laminated with polyethylene to prepare a multi-layer color photographic paper. Coating solutions were prepared in the following manner.

Fifteen g of yellow coupler (compound Y-31), 2.0 g of dye image stabilizer (A-35), 5.0 g of compounds of general formula (IV) (compound IV-I), 0.4 g of dye image stabilizer (Cpd-2), 2.0 g of dye image stabilizer (Cpd-1) and 2.0 g of sodium dodecylbenzenesulfonate were dissolved in 25 cc of ethyl acetate. The resulting solution was emulsified and dispersed in 150 cc of an aqueous solution of 10% lime-processed ossein gelatin (containing 1.5 g of citric acid) using a homogenizer.

Separately, the following blue-sensitive Sensitizing Dyes A and B were added to a silver chlorobromide emulsion (cubic, a 5:5 (by silver molar ratio) mixture of a larger-size Emulsion $B_1$ having a mean grain size of 0.85 $\mu$m and a smaller-size Emulsion $B_2$ having a mean grain size of 0.65 $\mu$m; a coefficient of variation in grain size distribution: 0.07 and 0.09, respectively; 0.2 mol % of silver bromide being localized on a part of the surface of the grain in each emulsion) in such an amount that $2.2\times10^{-4}$ mol of each of Sensitizing Dyes A and B was added to the larger emulsion, and $2.7\times10^{-4}$ mol of each of the sensitizing dyes was added to the smaller-size emulsion. The chemical ripening of the emulsion was carried out by adding a sulfur sensitizing agent and a gold sensitizing agent. The emulsion and the above emulsified dispersion were mixed and dissolved, and a coating solution for first layer was prepared so as to give the following composition named as First Layer.

Coating solutions for the second layer through the seventh layer were prepared in the same manner as in the preparation of the coating solution for the first layer.

Sodium salt of 1-oxy-3,5-dichloro-s-triazine was used as a hardening agent for gelatin in each layer. Cpd-10 and Cpd-11 were added to each layer in such an amount that the total amounts became 25.0 mg/m$^2$ and 50.0 mg/m$^2$, respectively.

The following spectral sensitizing dyes were used in the silver chlorobromide emulsion of each light-sensitive emulsion layer.

Blue Sensitive Emulsion Layer

Sensitizing Dye A

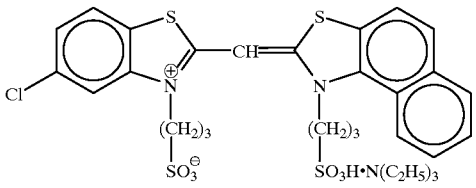

Sensitizing Dye B

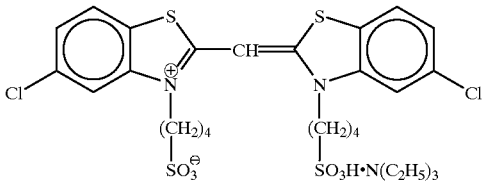

($2.0\times10^{-4}$ mol of each of sensitizing dyes A and B being added to the larger-size emulsion, and $2.5\times10^{-4}$ mol of each of the sensitizing dyes being added to the smaller-size emulsion, each amount being per mol of silver halide);

Green-Sensitive Emulsion Layer

Sensitizing Dye C

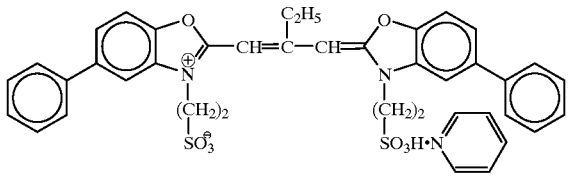

($4.0\times10^{-4}$ mol being added to the larger-size emulsion, and $5.6\times10^{-4}$ mol being added to the smaller-size emulsion, each amount being per mol of silver halide);

Sensitizing Dye D

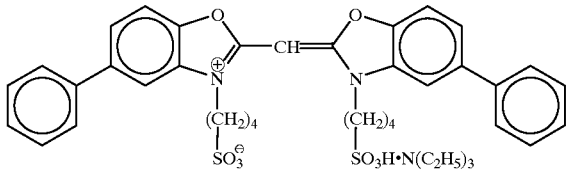

($7.0\times10^{-5}$ mol being added to the larger-size emulsion, and $1.0\times10^{-5}$ mol being added to the smaller-size emulsion, each amount being per mol of silver halide);

Red-Sensitive Emulsion Layer

Sensitizing Dye E

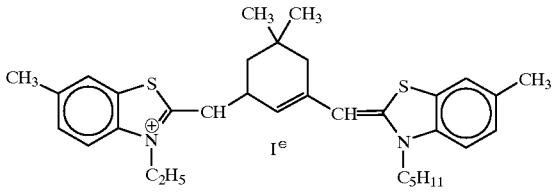

($0.9\times10^{-4}$ mol being added to the larger-size emulsion, and $1.1\times10^{-4}$ mol being added to the smaller-size emulsion, each amount being per mol of silver halide).

Further, $2.6\times10^{-3}$ mol of the following compound per mol of silver halide was added to the red-sensitive emulsion layer:

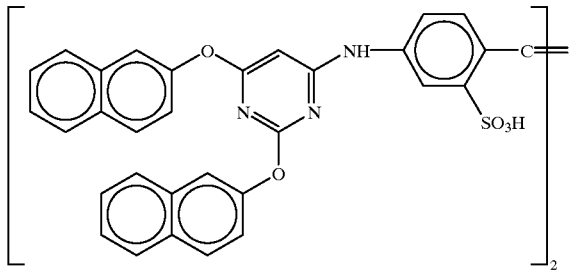

Further, $3.4\times10^{-4}$ mol, $9.7\times10^{-4}$ mol and $5.5\times10^{-4}$ mol of 1-(5-methylureidophenyl)-5-mercaptotetrazole were added to the blue-sensitive emulsion layer, the green-sensitive emulsion layer and the red-sensitive emulsion layer, respectively, each amount being per mol of silver halide. Furthermore, $1\times10^{-4}$ mol and $2\times10^{-4}$ mol of 4-hydroxy-6-methyl-1,3,3a,7-tetrazaindene were added to the blue-sensitive layer and the green-sensitive layer, respectively, each amount being per mol of silver halide.

The following dyes (parenthesized numbers indicating coating weight) were added to the emulsions to prevent irradiation:

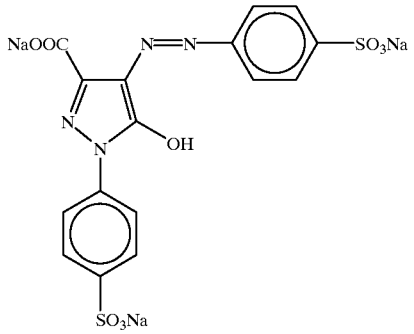

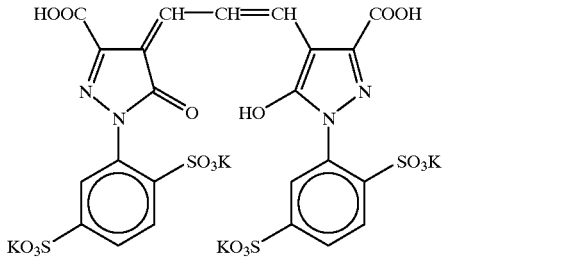

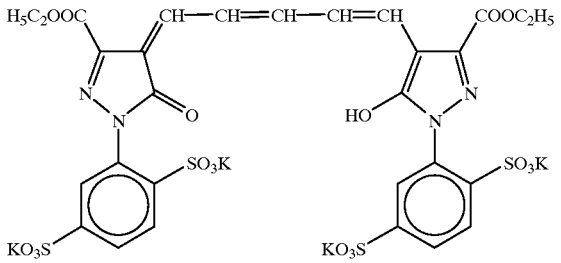

and

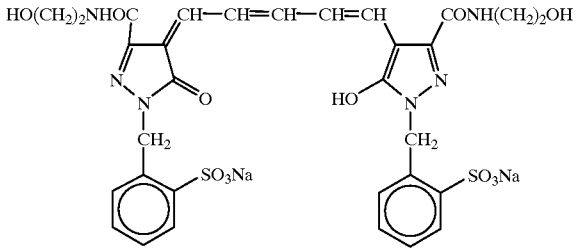

Layer Structure

Each layer had the following composition. The numbers represent coating weight (g/m$^2$). The amounts of the silver halide emulsions are represented by coating weight in terms of silver.

Support

Polyethylene-laminated paper

[Polyethylene on the first layer side contained white pigment ($TiO_2$) and bluish dye (ultramarine)]

| | |
|---|---|
| First layer (yellow color forming emulsion layer) | |
| The above silver chlorobromide emulsion | 0.27 |
| Gelatin | 1.10 |
| Yellow coupler (Compound Y-31) | 0.75 |
| Epoxy compound of invention (Compound A-35) | 0.02 |
| Dye image stabilizer (Cpd-2) | 0.02 |
| Dye image stabilizer (Cpd-1) | 0.20 |
| Solvent (Solv-1) | 0.25 |
| Second layer (color mixing inhibiting layer) | |
| (10 mg/m$^2$) | |
| (10 mg/m$^2$) | |
| (40 mg/m$^2$) | |
| (20 mg/m$^2$) | |
| Gelatin | 0.99 |
| Color mixing inhibitor (Cpd-4) | 0.08 |
| Solvent (Solv-7) | 0.02 |
| Solvent (Solv-2) | 0.25 |
| Solvent (Solv-3) | 0.25 |
| Third layer (magenta color forming emulsion layer) | |
| silver chlorobromide emulsion (cubic, a 6:4 (by Ag molar ratio) mixture of a larger-size emulsion $G_1$ having a mean grain size of 0.52 and a smaller-size emulsion $G_2$ having a mean grain size of 0.42 $\mu$m; a coefficient of variation in grain size distribution: 0.10 and 0.08, respectively; 0.8 mol % of AgBr being localized on a part of the surface of the grain in each emulsion) | 0.13 |
| Gelatin | 1.45 |
| Magenta coupler (ExM) | 0.16 |
| Dye image stabilizer (Cpd-6) | 0.15 |
| Dye image stabilizer (Cpd-2) | 0.03 |
| Dye image stabilizer (Cpd-7) | 0.01 |
| Dye image stabilizer (Cpd-8) | 0.01 |
| Dye image stabilizer (Cpd-9) | 0.08 |
| Solvent (Solv-3) | 0.50 |
| Solvent (Solv-4) | 0.15 |
| Solvent (Solv-5) | 0.15 |
| Fourth layer (color mixing inhibiting layer) | |
| Gelatin | 0.70 |
| Color mixing inhibitor (Cpd-4) | 0.06 |
| Solvent (Solv-7) | 0.02 |
| Solvent (Solv-2) | 0.20 |
| Solvent (Solv-3) | 0.20 |
| Fifth layer (cyan color forming emulsion layer) | |
| silver chlorobromide emulsion (cubic, a 7:3 (by Ag molar ratio) mixture of a larger-size emulsion $R_1$ having a mean grain size of 0.58 $\mu$m and a smaller-size emulsion R2 having a mean grain size of 0.45 $\mu$m; a coefficient of variation in grain size distribution: 0.09 and 0.11, respectively; 0.6 mol % of AgBr being localized on a part of the surface of the grain in each emulsion) | 0.20 |
| Gelatin | 0.85 |
| Cyan coupler (ExC) | 0.33 |
| Ultraviolet light absorber (UV-2) | 0.18 |
| Dye image stabilizer (Cpd-1) | 0.33 |
| Dye image stabilizer (Cpd-10) | 0.15 |
| Dye image stabilizer (Cpd-11) | 0.15 |
| Dye image stabilizer (Cpd-12) | 0.01 |
| Dye image stabilizer (Cpd-9) | 0.01 |
| Dye image stabilizer (Cpd-7) | 0.01 |
| Solvent (Solv-6) | 0.22 |
| Solvent (Solv-1) | 0.01 |
| Sixth layer (ultraviolet light absorbing layer) | |
| Gelatin | 0.55 |
| Ultraviolet light absorber (UV-1) | 0.42 |
| Dye image stabilizer (Cpd-13) | 0.15 |

-continued

| | |
|---|---|
| Dye image stabilizer (Cpd-6) | 0.02 |
| Seventh layer (protective layer) | |
| Gelatin | 1.13 |
| Acrylic-modified copolymer of polyvinyl alcohol (degree of modification: 17%) | 0.15 |
| Liquid paraffin | 0.03 |
| Dye image stabilizer (Cpd-14) | 0.01 |

The compounds used above are the same as those disclosed in Example 1.

The thus-obtained sample was referred to as Sample No. 401.

Sample Nos. 402 to 409 were prepared in the same manner as in the preparation of Sample No. 401, except that the composition of the first layer was changed as indicated in Table 6.

Sample No. 401 was subjected to gray exposure so as to allow about 30% of the amount of silver coated to be developed by using a sensitometer (FWH type, color temperature of light source: 3200° K, manufactured by Fuji Photo Film Co., Ltd.).

After exposure, each exposed sample was subjected to continuous processing by using a paper processor and the following processing solutions having the following compositions in the following processing stages to prepare the process state of running equilibrium state.

| Processing stage | Temp. | Time | Replenisher* | Tank capacity |
|---|---|---|---|---|
| Color development | 35° C. | 45 sec | 161 ml | 171 |
| Bleaching-fixing | 30~35° C. | 45 sec | 215 ml | 171 |
| Rinse | 30° C. | 90 sec | 350 ml | 101 |
| Drying | 70~80° C. | 60 sec | | |

*Replenishment rate being per $m^1$ of light-sensitive material

Each processing solution had the following composition.

| | Tank Solution | Replenisher |
|---|---|---|
| Color developer solution | | |
| Water | 800 ml | 800 ml |
| Ethylenediamine-N,N,N',N'-tetramethylenephosphoric acid | 1.5 g | 2.0 g |
| Potassium bromide | 0.015 g | — |
| Triethanolamine | 8.0 g | 12.0 g |
| Sodium chloride | 1.4 g | — |
| Potassium carbonate | 25 g | 25 g |
| N-Ethyl-N-(β-methanesulfonamidoethyl)-3-methyl-4-aminoaniline sulfate | 5.0 g | 7.0 g |
| N,N-Bis(carboxymethyl)-hydrazine | 4.0 g | 5.0 g |
| N,N-Di(sulfoethyl)hydroxylamine mono-Na salt | 4.0 g | 5.0 g |
| Fluorescent brightener (WHITEX 4B manufactured Sumitomo Chemical Co., Ltd.) | 1.0 g | 2.0 g |
| Add water to make | 1000 ml | 1000 ml |
| pH (25° C.) | 10.05 | 10.45 |

-continued

| Bleach-fixing solution (Tank solution and replenisher being the same) | |
|---|---|
| Water | 400 ml |
| Ammonium thiosulfate (700 g/l) | 100 ml |
| Sodium sulfite | 17 g |
| Ammonium ethylenediaminetetraacetato ferrate (III) | 55 g |
| Disodium ethylenediaminetetracetate | 5 g |
| Ammonium bromide | 40 g |
| Add water to make | 1000 ml |
| pH (25° C.) | 6.0 |

Rinsing Water (Tank solution and replenisher being the same)

Ion-exchanged water (the concentration of each of calcium ion and magnesium ion being reduced to not higher than 3 ppm).

Each sample was evaluated in the following manner:

(A) Fluctuation in Gradation of Developed Yellow Color Area

Each of Sample Nos. 401 to 409 was subjected to gradation exposure through a three color separation filter for sensitometry by using a sensitometer (FWH type manufactured by Fuji Photo Film Co., Ltd.), and processing with the processing solutions before continuous processing in the above processing stages and processing in the running equilibrium state were carried out.

In both processings, a change in gradient (gamma) of in the area ranging from a density of 0.8 to a density of 1.8 on the characteristics curve of developed yellow color area, i.e., Δgamma was determined. Fluctuation in gradation caused by processing is smaller the closer Δgamma to zero. Thus, a smaller Δgamma value is preferable.

(B) Preservability of Yellow Dye Image

The samples processed in the running equilibrium state in the above (A) were stored at 80° C. and 60% RH for 40 days. The ratio $[D/D_0(\%)]$ of a density D after storage to an initial yellow density $D_0$ of 2.0 was calculated. The fastness of the yellow dye image to light is higher the closer the value to 100. Namely, a higher value is preferable.

Further, an increase ($\Delta D_{magenta}$) in magenta density before and after storage at an initial yellow density of 2.0 and an increase ($\Delta D_{cyan}$) in cyan density before and after storage at an initial yellow density of 2.0 were measured. A smaller $\Delta D_{magenta}$ and $\Delta D_{cyan}$ value means that an increase in the turbidity of yellow color is smaller. Namely, a smaller value is preferable.

The above-described evaluation of Sample Nos. 401 to 409 was made. The results are shown in Table 6.

TABLE 6

| Sample No. | Epoxy compound having at least one group of formula (AO) | Compound of formula (IV) | Δgamma | $D/D_0$ [%] | $\Delta D_{magenta}$ | $\Delta D_{cyan}$ | Remarks |
|---|---|---|---|---|---|---|---|
| 401 | A-35 (x = 7.5) | Solv-1 | 0.11 | 90 | 0.19 | 0.03 | Invention |
| 402 | A-34 (x = 7.5) | Solv-1 | 0.11 | 90 | 0.19 | 0.03 | Invention |
| 403 | A-35 (x = 7.5) | — | 0.40 | 75 | 0.33 | 0.06 | Comp. Ex. |
| 404 | A-34 (x = 7.5) | — | 0.40 | 72 | 0.33 | 0.06 | Comp. Ex. |
| 405 | A-35 (x = 7.5) | Comparative Compound A* | 0.33 | 72 | 0.33 | 0.07 | Comp. Ex. |
| 406 | A-34 (x = 7.5) | Comparative Compound A* | 0.33 | 70 | 0.33 | 0.07 | Comp. Ex. |
| 407 | — | Solv-1 | 0.33 | 70 | 0.35 | 0.09 | Comp. Ex. |
| 408 | — | — | 0.56 | 65 | 0.46 | 0.10 | Comp. Ex. |
| 409 | — | Comparative Compound A* | 0.42 | 65 | 0.46 | 0.10 | Comp. Ex. |

*Comparative Compound A

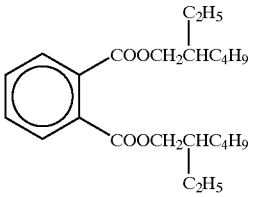

It can be seen from Table 6 that only Sample Nos. 401 and 402 containing an epoxy compound having at least one group of formula (AO) and a compound of formula (IV) in combination cause scarcely any fluctuation in gradation (Δgamma) before and after running and are excellent in the preservability of image in the developed yellow color area.

EXAMPLE 5

Sample Nos. 501 to 511 were prepared in the same manner as in the preparation of Sample No. 401 of Example 4, except that an equimolar amount of a 1:1 (by weight) mixture of yellow couplers Y-31 and Y-2 was used in place of Y-31 and further the compounds and the amounts thereof were changed as indicated in Table 7In the same manner as in Example 4, processing and evaluation were made. The results are shown in Table 7.

TABLE 7

| Sample No. | Epoxy compound having at least one group of formula (AO) | Compound of formula (IV) | Δgamma | $D/D_0$ [%] | $\Delta D_{magenta}$ | $\Delta D_{cyan}$ | Remarks |
|---|---|---|---|---|---|---|---|
| 501 | A-35 (x = 7.5) | Solv-1 | 0.10 | 91 | 0.18 | 0.03 | Invention |
| 502 | A-35 (x = 7.5) | IV-5 | 0.11 | 90 | 0.18 | 0.03 | Invention |
| 503 | A-35 (x = 7.5) | IV-9 | 0.10 | 90 | 0.19 | 0.03 | Invention |
| 504 | A-35 (x = 7.5) | IV-12 | 0.11 | 90 | 0.19 | 0.03 | Invention |
| 505 | A-10 | Solv-l | 0.11 | 91 | 0.19 | 0.04 | Invention |
| 506 | A-18 | Solv-l | 0.11 | 90 | 0.19 | 0.04 | Invention |
| 507 | A-34 (x = 7.5) | Solv-1 | 0.10 | 90 | 0.19 | 0.03 | Invention |
| 508 | A-36 (x = 5.5) | IV-1 | 0.10 | 91 | 0.19 | 0.04 | Invention |
| 509 | A-35 (x = 7.5) | — | 0.41 | 72 | 0.34 | 0.08 | Comp. Ex. |
| 510 | — | Solv-1 | 0.35 | 69 | 0.37 | 0.09 | Comp. Ex. |
| 511 | — | — | 0.55 | 60 | 0.48 | 0.11 | Comp. Ex. |

It can be seen from Table 7 that only samples 501 to 508 containing an epoxy compound having at least one group of formula (AO) and a compound of formula (IV) cause scarcely any fluctuation in gradation (Δgamma) before and after running and are excellent in the preservability of image in developed yellow color area.

EXAMPLE 6

Samples were prepared in the same manner as in the preparation of Sample No. 401 of Example 4, except that an equimolar amount of yellow coupler Y-2, Y-6, Y-12, Y-20 or Y-34 was used in respective samples in place of Y-31. In the same manner as in Example 4, evaluation was made. It was found that only samples containing an epoxy compound having at least one group of formula (AO) and a compound of formula (IV) in combination cause scarcely any fluctuation in gradation (Δgamma) before and after running and are excellent in the preservability of image in developed yellow color area.

It will be understood that according to the present invention, there can be obtained a silver halide color photographic material which has good yellow color develop-ability and is excellent-in fastness to light. It will be further understood that according to the present invention there can be obtained a silver halide color photographic material which causes scarcely any fluctuation in gradation even when running-processed and which gives a dye image excellent in preservability after processing.

While the invention has been described in detail and with reference to specific embodiments thereof, it will be apparent to one skilled in the art that various changes and modifications can be made therein without departing from the spirit and scope thereof.

What is claimed is:

1. A silver halide color photographic material comprising a support having thereon a yellow color forming silver halide emulsion layer, a magenta color forming silver halide emulsion layer and a cyan color forming silver halide emulsion layer, wherein said yellow color forming emulsion layer contains, (i) at least one high silver chloride emulsion having a silver chloride content of not less than 90 mol %, (ii) at least one yellow coupler represented by the following general formula (I) and (iii) at least one compound represented by the following general formula (II), and wherein one or more layers of the photographic material contains at least one ultraviolet light absorber:

(I)

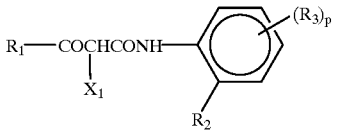

wherein $R_1$ represents a substituent group; $R_2$ represents a halogen atom, an alkyl group, an aryl group, an alkoxy group, an aryloxy group, a dialkylamino group, an alkylthio group or an arylthio group; $R_3$ represents a group which can be attached to the benzene ring; $X_1$ represents a hydrogen atom or a group which can be eliminated by a coupling reaction with the oxidation product of an aromatic primary amine developing agent; and p represents an integer of 0 to 4 and when p is 2 or greater, the two or more R3 groups may be the same or different;

(II)

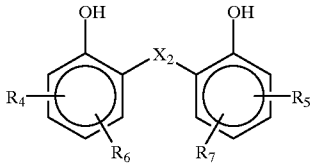

wherein $R_4$, $R_5$, $R_6$ and $R_7$ each represents an alkyl group [having 4 to 18 carbon atoms] and the total number of carbon atoms in $R_4$, $R_5$, $R_6$ and $R_7$ is not more than 32; and $X_2$ represents a simple bond, an oxygen atom, a sulfur atom, a sulfonyl group or a bonding group represented by the following general formula (B):

(B)

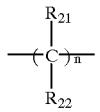

wherein $R_{21}$ and $R_{22}$ each represents a hydrogen atom or an alkyl group having 1 to 10 carbon atoms; and n represents an integer of 1 to 3 and when n is 2 or 3, the two or three $R_{21}$ groups and the two or three $R_{22}$ groups may be the same or different.

2. The silver halide color photographic material as in claim 1, wherein said ultraviolet light absorber is a compound having an absorption peak in the range of 330 to 400 nm and no absorption peak in the range of 420 to 750 nm.

3. The silver halide color photographic material as in claim 2, wherein said ultraviolet light absorber is represented by the following formula (Va):

(Va)

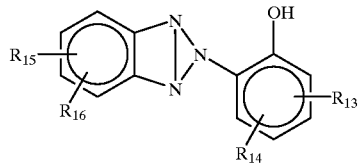

wherein $R_{13}$ to $R_{16}$ each represents a hydrogen atom, a halogen atom, a nitro group, a hydroxyl group, an alkyl group, an alkoxy group, an aryl group, an aryloxy group, an acylamino group, a carbamoyl group, a sulfo group, an alkylthio group or an arylthio group, wherein $R_{13}$ and $R_{14}$, and/or $R_{15}$ and $R_{16}$ may combine to form a ring.

4. The silver halide color photographic material as in claim 2, wherein said ultraviolet light absorber is represented by the following formula (Vb):

(Vb)

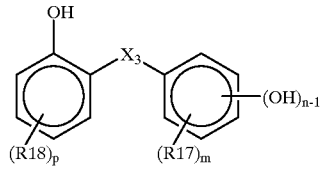

wherein $R_{17}$ and $R_{18}$ each represents a hydrogen atom, an alkyl group or an acyl group, wherein $X_3$ represents —CO— or —COO—, and wherein n represents an integer of 1 to 4, m represents an integer of 3 to 5, and p represents an integer of 1 to 4.

5. The silver halide color photographic material as in claim 1, wherein said yellow color forming emulsion layer further contains at least one epoxy compound which has at least one group represented by the following general formula (AO):

(AO)

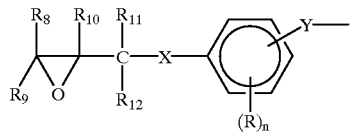

wherein $R_8$, $R_9$, $R_{10}$, $R_{11}$ and $R_{12}$ may be the same or different and each represents a hydrogen atom, an alkyl group or an aryl group; R represents a substituent group; n represents an integer of 0 to 4; —Y— represents a bivalent bonding group; —X— represents —O—, —S— or —N(R')—; R' represents a hydrogen atom, an acyl group, an alkylsulfonyl group, an arylsulfonyl group, an aryl group, a heterocyclic group or —$C(R_{13})(R_{14})(R_{15})$; and $R_{13}$, $R_{14}$ and $R_{15}$ may be the same or different and each represents an alkyl group or a group represented by the following general formula (AO-1):

(AO-1)

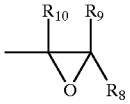

and $R_{13}$ and $R_{14}$ each may also represent a hydrogen atom; and when n is 2 to 4, the two or more R groups may be the same or different, or any two of $R_8$ to $R_{12}$, R' and the one R or two R groups may combine to form a five-membered to seven-membered ring, provided that when X is —S—, the total number of carbon atoms in the compound is not less than 15; when X is —O— and Y is —$SO_2$— or a phenylene, either n is an integer of 1 to 4 or at least one of $R_8$ to $R_{12}$ is an alkyl group or an aryl group; or when X is —O— and Y is —O—$CO_2$—, the total number of carbon atoms in $R_8$ to $R_{12}$ and the R group or groups is not less than 10.

6. The silver halide color photographic material as in claim 5, wherein said epoxy compound contains at least three groups according to general formula (AO).

7. The silver halide color photographic material as in claim 5, wherein said epoxy compound contains at least four groups according to general formula (AO).

8. The silver halide color photographic material as in claim 5, wherein said epoxy compound contains at least five groups according to general formula (AO).

9. A silver halide color photographic material comprising a support having thereon a yellow color forming silver halide emulsion layer, a magenta color forming silver halide emulsion layer and a cyan color forming silver halide emulsion layer, wherein said yellow color forming emulsion layer contains (i) at least one high silver chloride emulsion having a silver chloride content of not less than 90 mol %, (ii) at least one yellow coupler represented by the following general formula (I):

(I)

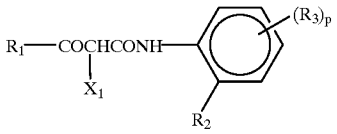

wherein [$R_1$ represents a substituent group;] *$R_1$ in general formula (I) represents a group represented by general formula (D):*

(D)

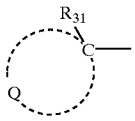

*wherein $R_{31}$* represents a monovalent substituent group excluding a hydrogen atom; and Q represents a nonmetallic atomic group required for forming a three-*membered to five-membered hydrocarbon group together with C or a non-metallic atomic group required for forming a three-membered to five-membered heterocyclic ring together with C, said heterocyclic ring having at least one heteroatom, as a member of the ring, selected from the group consisting of N, S, O and P;* $R_2$ represents a halogen atom, an alkyl group, an aryl group, and alkoxy group, an aryloxy group, a dialkylamino group, an alkylthio group or an arylthio group; $R_3$ represents a group which can be attached to the benzene ring, $X_1$ represents a hydrogen atom or a group which can be eliminated by a coupling reaction with the oxidation product of an aromatic primary amine developing agent; and p represents an integer of 0 to 4 and when p is 2 or greater, the two or more $R_3$ groups may be the same or different[;], (iii) at least one epoxy compound which has at least one group represented by the following general formula (AO) and which is difficulty soluble in water:

(AO)

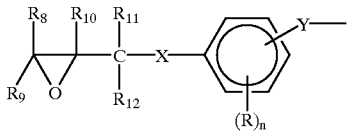

wherein $R_8$, $R_9$, $R_{10}$, $R_{11}$ and $R_{12}$ [maybe] *are* the same or different and each represents a hydrogen atom, an alkyl group or an aryl group; R represents a substituent group; n represents an integer of 0 to 4; —Y— represents a bivalent bonding group; —X— represents —O—, —S— or —N(R')—; R' represents a hydrogen atom, an acyl group, an alkylsulfonyl group, an arylsulfonyl group, an aryl group, a heterocyclic group or —C($R_{13}$)($R_{14}$)($R_{15}$); and $R_{13}$, $R_{14}$ and $R_{15}$ may be the same or different and each represents an alkyl group or a group represented by the following general formula (AO-1):

(A-O-1)

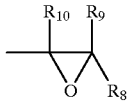

and $R_{13}$ and $R_{14}$ each may also represent a hydrogen atom; and when n is 2 to 4, the two or more R groups may be the same or different, or any two of $R_8$ to $R_{12}$, R' and the one R or two R groups may combine to form a five-membered to seven-membered ring, provided that when X is —S—, the total number of carbon atoms in the compound is not less than 15; when X is —O— and Y is —$SO_2$— or a phenylene, either n is an integer of 1 to 4 or at least one of $R_8$ to $R_{12}$ is an alkyl group or an aryl group; or when X is —O— and Y is —O—$CO_2$—, the total number of carbon atoms in $R_8$ to $R_{12}$ and the R group or groups is not less than 10; and (iv) at least one compound represented by the following general formula (IV):

(IV)

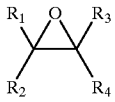

wherein $R_1$, $R_2$, $R_3$ and $R_4$ *in general formula (IV)* independently represent a hydrogen atom, an aliphatic group, an aromatic group, an aliphatic oxycarbonyl group, an aromatic oxycarbonyl group or a carbamoyl group with the proviso that all of $R_1$, $R_2$, $R_3$ and $R_4$ are not simultaneously a hydrogen atom; the total number of carbon atoms in $R_1$ to $R_4$ is 8 to 60; and $R_1$ and $R_2$ or $R_3$ and $R_4$ may combine to form a five-membered to seven-membered ring.

10. The silver halide color photographic material as in claim 1, wherein $R_1$ in the above defined general formula (I)

represents an aryl group, a tert-alkyl group or a group represented by the following general formula (D):

(D)

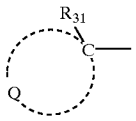

wherein $R_{31}$ represents a monovalent substituent group excluding a hydrogen atom; and Q represents a nonmetallic atomic group required for forming a three-membered to five-membered hydrocarbon group together with C or a non-metallic atomic group required for forming a three-membered to five-membered heterocyclic ring together with C, said heterocyclic ring having at least one heteroatom, as a member of the ring, selected from the group consisting of N, S, O and P.

11. The silver halide color photographic material as in claim 1, wherein $R_1$ in general formula (I) represents a group represented by general formula (D):

(D)

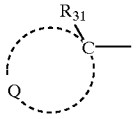

wherein $R_{31}$ represents a monovalent substituent group excluding a hydrogen atom; and Q represents a non-metallic atomic group required for forming a three-membered to five-membered hydrocarbon group together with C or a non-metallic atomic group required for forming a three-membered to five-membered heterocyclic ring together with C, said heterocyclic ring having at least one heteroatom, as a member of the ring selected from the group consisting of N, S, O and P.

[12. The silver halide color photographic material as in claim 9, wherein $R_1$ in general formula (I) represents an aryl group, a tert-alkyl group or a group represented by general formula (D):

(D)

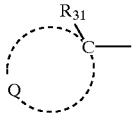

wherein $R_{31}$ represents a monovalent substituent group excluding a hydrogen atom; and Q represents a non-metallic atomic group required for forming a three-membered to five-membered hydrocarbon group together with C or a non-metallic atomic group required for forming a three-membered to five-membered heterocyclic ring together with C, said heterocyclic ring having at least one heteroatom, as a member of the ring, selected from the group consisting of N, S, O and P.]

[13.The silver halide color photographic material as in claim 9, wherein $R_1$ in general formula (I) represents a group represented by general formula (D):

(D)

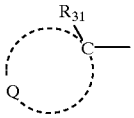

wherein $R_{31}$ represents a monovalent substituent group excluding a hydrogen atom; and Q represents a non-metallic atomic group required for forming a three-membered to five-membered hydrocarbon group together with C or a non-metallic atomic group required for forming a three-membered to five-membered heterocyclic ring together with C, sad heterocyclic ring having at least one heteroatom, as a member of the ring, selected from the group consisting of N, S, O and P.]

14. The silver halide color photographic material as in claim 5, wherein said epoxy compound having at least one group represented by general formula (AO) contains at least two benzene rings.

15. The silver halide color photographic material as in claim 5, wherein said epoxy compound having at least one group represented by general formula (AO) contains at least three benzene rings.

16. The silver halide color photographic material as in claim 5, wherein said epoxy compound having at least one group represented by general formula (AO) contains at least four benzene rings.

17. The silver halide color photographic material as in claim 9, wherein said epoxy compound having at least one group represented by general formula (AO) contains at least two benzene rings.

18. The silver halide color photographic material as in claim 9, wherein said epoxy compound having at least one group represented by general formula (AO) contains at least three benzene rings.

19. The silver halide color photographic material as in claim 9, wherein said epoxy compound having at least one group represented by general formula (AO) contains at least four benzene rings.

20. The silver halide color photographic material as in claim 1, wherein said ultraviolet light absorber is added to a silver halide emulsion layer which is the farthest of any emulsion layer from the support.

* * * * *